United States Patent [19]

Green

[11] Patent Number: 5,517,494
[45] Date of Patent: May 14, 1996

[54] METHOD AND SYSTEM OF MULTICAST ROUTING FOR GROUPS WITH A SINGLE TRANSMITTER

[75] Inventor: Mark A. Green, Albany, Calif.

[73] Assignee: Apple Computer, Inc., Cupertino, Calif.

[21] Appl. No.: 316,081

[22] Filed: Sep. 30, 1994

[51] Int. Cl.⁶ .............................. H04L 12/46; H04L 12/56
[52] U.S. Cl. ............................................. 370/60; 370/85.14
[58] Field of Search ...................................... 395/200, 325; 370/58.1, 54, 60, 85.13, 85.14

[56] References Cited

U.S. PATENT DOCUMENTS

| | | | |
|---|---|---|---|
| 5,243,592 | 9/1993 | Perlman et al. | 370/17 |
| 5,251,213 | 10/1993 | Videlock et al. | 370/85.13 |
| 5,282,270 | 1/1994 | Oppenheimer et al. | 395/200 |
| 5,291,477 | 3/1994 | Liew | 370/60.1 |
| 5,293,635 | 3/1994 | Faulk, Jr. et al. | 370/85.13 |
| 5,321,694 | 6/1994 | Chang et al. | 370/85.13 |
| 5,331,637 | 7/1994 | Francis et al. | 370/54 |
| 5,355,371 | 10/1994 | Auerbach et al. | 370/85.13 |

OTHER PUBLICATIONS

Multicast Routing in Internetworks and Extended LANs, Stephen E. Deering, 1988, pp. 55–64.
Multicast support for group communications, L. H. Ngoh, Computer Networks and ISND Systems 22, 1991, pp. 165–178.
Multicast Source Routing in Packet-Switched Networks, Yum and Chen, IEEE, 1991, pp. 1284–1288.
Multicast Routing for Multimedia Communication, Vachaspathi P. Kompella et al., IEEE, vol. 1, No. 3, Jun. 1993, pp. 286–292.
On Multicast Path Finding Algorithms, Ching-Hua Chow, IEEE, 1991, pp. 1274–1283.
Multicast Transport Protocol, S. Armstrong, et al., IEEE, Internet, Feb. 1992, pp. 1–38.
Host Groups: A Multicast Extension for Datagram Internetworks, Cheriton & Deering, Computer Systems Laboratory, Stanford University, 1985, pp. 172–179.

Primary Examiner—Benedict V. Safourek
Attorney, Agent, or Firm—Carr, DeFilippo & Ferrell

[57] ABSTRACT

A method of implementing a multicast routing protocol in routers is provided to manage the assignment of multicast transport addresses and to forward data from a single transmitting endpoint to multiple receiving endpoints. This method in conjunction with a method for implementing the multicast routing protocol as a transport protocol layer service for endpoints provides an internet wide multicast transport service. The multicast transport service provides the capability of transmitting data from a single source to multiple receivers on interconnected networks efficiently and without having to send duplicate copies of the data on any single network. Routers and endpoints transmit and receive multicast packets in a manner which is independent of the network layer datagram protocols used by the multicast transport service. Multicast control packets are exchanged using a multicast transaction protocol which allows routers and endpoints to execute transactions in a manner that does not require either routers to know the state of specific endpoints or endpoints to know the state of specific routers.

18 Claims, 25 Drawing Sheets

Multicast Routing Protocol

Multicast Routing Protocol

FIG. 17 Multicast Transaction Protocol - Router

Multicast Transaction Protocol - Router

Multicast Transaction Protocol - Router

Multicast Transaction Protocol - Endpoint

Multicast Transaction Protocol - Endpoint

METHOD AND SYSTEM OF MULTICAST ROUTING FOR GROUPS WITH A SINGLE TRANSMITTER

BACKGROUND OF THE INVENTION

1. Field of the Invention

The present invention relates generally to transmitting and receiving data organized into packets between different computer systems on multiple interconnected networks. More particularly, the present invention relates to a system and a method for routing multicast packets transmitted from a single computer system to a specific set of computer systems called a multicast group. The present invention provides a new method for building multicast distribution trees and efficiently delivering data to multicast groups.

2. Description of the Related Art

As computer systems continue to grow in complexity and user availability, the need for more efficient communication between computer systems also increases. Moreover, as more coworkers utilize computer systems on different local area networks (LANs), the need has developed for better multicast communication systems enabling more efficient data transfer between multiple interconnected LANs having multiple computer users on each LAN.

The transmission of data between computer systems can be grouped into three major categories: unicast, broadcast, and multicast. Unicasting involves the exchange of data between two individual computers. Broadcasting involves one computer transmitting data to all the other computers on interconnected networks. Finally, multicasting involves the transmission of data from computers to a specific group of one or more receiving computers.

Interconnected computers are typically set up in the following manner. A single LAN generally consists of a physical bus or ring to which multiple individual computers are all connected in common. A LAN is referred to as a network. Different networks can be interconnected using a router which is a single computer, that interconnects the LANs. Multiple interconnected networks are called an internet. In order to provide further background information on multicasting on networks, U.S. patent application entitled "Method and Apparatus for Operating a Multicast System on an Unreliable Network", filed on May 13, 1994, having Ser. No. 08/242,138, and which the Applicant is a co-inventor, is hereby incorporated by reference into this patent application. U.S. patent entitled "Multicast Routing Using Core Based Trees", issued Jul. 19, 1994, and having U.S. Pat. No. 5,331,637, is also hereby incorporated by reference into this patent application.

Typically, when a computer on a first network is transmitting data to be multicast to other networks, most of the routers and all of the networks are utilized in order to relay and transmit data to the receiver computers. By requiring most of the routers and all of the networks to be utilized, these networks may be "crowded" by the unnecessary multiple data transmissions in order to accommodate all the various communications being carried by the common networks and connecting routers of the internet.

In order to minimize the amount of communication traffic on an internet, various methods or protocols have been developed for multicast routing to reduce the number of routers and networks required to forward data to the desired receiver computers. Prior art protocols typically utilize complex algorithms in order to determine intended transmitting and receiving computers, and also the most efficient path and required routers to be utilized in order to forward the transmitted data to the intended receiver computers. This complexity is generally due to allowing more than one computer to transmit to a group. Moreover, prior art protocols require a sending computer to transmit data continuously when the data is available, as opposed to transmitting the data in response to specific requests.

Accordingly, it would be desirable to provide a method and system that increases the efficiency of multicasting procedures when only a single sending computer is required per group, while minimizing the complexity of the multicasting procedure and also enabling sending computers to transmit data only when the sending computers have received requests from one or more computers to receive the data.

SUMMARY OF THE INVENTION

Accordingly, the present invention provides a connectionless best-effort delivery of multicast datagrams throughout an internet. The method for implementing the multicast routing protocol in routers manages the assignment of multicast addresses and forwards data transmitted from a single source to each network which has receivers requesting data with the multicast address. This method in conjunction with a method for implementing the protocol as a transport protocol layer in senders and receivers provides an internet wide multicast transport service. The multicast service provides the capability of transmitting data from a single source to multiple receivers without having to send duplicate copies of the data on any individual network. Routers, senders and receivers exchange multicast packets over network layer datagram protocols using multicast protocol headers at the transport layer. The multicast transport layer is independent of the network layer utilized for its datagram service. This allows the multicast routing protocol to run over a variety of network layer protocols.

Multicast distribution trees are built and maintained by routers in order to optimize the routing of multicast data through an internet. The method of the present invention requires that each router only needs to store information about the portion of a distribution tree known by each of its neighbor routers. The distribution tree for a particular multicast group is built incrementally as networks include listeners (receivers or routers which are forwarding data) that join a group, and the distribution tree is torn down incrementally when networks have no more listeners in the group. When the first listener on a network joins the particular group, that network and any networks between that network and the existing multicast distribution tree for that group are added as new branches to the distribution tree. When the last listener on a network leaves the particular group, that network and possibly some networks between that network and the existing multicast distribution tree for the group are removed as branches from the tree. All of these tree management functions are managed by routers exchanging the multicast routing protocol packets. Additionally, the distribution trees are maintained when new routers appear on a network and when routers disappear.

In accordance with another aspect of the present invention, a multicast address identifies the network on which the sender resides as it contains a network number assigned to the sender's network. Each network is assigned a unique range of network numbers for multicast addresses. In prior art multicast protocols the multicast address does not carry any identifying information other than it being designated a multicast address.

In accordance with a further aspect of the present invention, multicast addresses are assigned by routers. This provides a plug and play protocol. Typical prior art multicast protocols require multicast addresses to be obtained from some other human administrative agency and then be assigned by a computer user to the software that implements the multicast sending and receiving. While in prior art protocols network number ranges are typically used for unicast addresses, the network number ranges in the present invention are assigned specifically for multicast addresses. The address space of the multicast transport layer is completely independent of the address space of the unicast network layer.

The method of the present invention builds a multicast distribution tree using the network number ranges described above. A modified distance vector routing method is used to build routing tables in each of the routers which contain for each network number range (i.e. each network) the unicast network layer address of the adjacent router that is closest to that network. An adjacent router is a second router on one of the same networks as a first router, i.e., the adjacent router is directly connected to the first router.

The routing method of the present invention is novel by using a transaction protocol to exchange routing data between adjacent routers. Moreover, the method only exchanges routing data on routes that have changed. Conventional routing protocols constantly retransmit routing data. Some of the conventional routing protocols attempt to minimize the number of routes sent but still send these routes periodically. These protocols are said to be refresh protocols and the resulting routing tables are said to have a soft state. The present invention uses transaction protocols to preserve a rigid state in routing tables. A novel feature of the invention is that routing tables are maintained to find sources of multicast network numbers. In other protocols routing tables are used to find destinations of unicast network numbers.

Another method of the present invention builds distribution trees using the routing tables described above. Receivers wishing to get multicast data for a particular group request that a router on their network send the receivers the data with that group's multicast address. If the router is already forwarding that group's data on this network, the router has to do nothing but notify the receiver to start receiving. If the router is not forwarding the data for that group, the router must find an adjacent router that is closest to the sender for the group and ask the adjacent router to forward the data. The router extracts the network number from the multicast address. This identifies the network on which the group sender is located. The closest router to the sender is found using the network number to look through the routing table. The routing table is scanned until the network number falls in the network number range for some network. The table contains the next closer adjacent router to this network. The local router then asks this next closer router to forward the data.

This process may not end with the next closer router as that router still may be receiving the group's data also and that router may have to ask the next closer router. The process eventually ends when a router is reached that is receiving that group's data or the designated router on the group sender's network is reached. Essentially the request is forwarded until it reaches the distribution tree and new branches are added to the distribution tree for all of the networks in the path. The newly reached routers now start forwarding the data to these branches which were just added. Likewise a branch for a group is removed when a router has no more forwarding routers or receivers listening to the router on that branch. This may also propagate towards the sender's network causing more networks to be removed from the distribution tree.

In accordance with a further aspect of the present invention, all transactions are instigated from receiving computers to add these networks or "branches" to a distribution tree. Receivers completely control the adding and removing of branches from the tree. Prior art protocols are typically completely source based or are a mix of the two. Usually a source based multicast system will send data out on the entire network periodically to inform routers that the group exists. Routers then query networks to see if receivers for the group exist. Networks are removed when no receivers respond in a certain amount of time.

Other systems function by having all of the routers on the internet be informed that a source is now sending multicast data for a group. This data initially is forwarded only on the sender's network. When a receiver on the internet wants the data for the group then router to router contact is made through information stored when the sender made its announcement to the internet. The present invention is distinguishable over prior art protocols because in the present invention group information is only initially maintained in the router that created the group. Information about a particular group is not maintained in other routers until that router is asked to forward data for that group and that router becomes part of the multicast distribution tree from the group. Group information is only maintained while the router is on the distribution tree for that group.

The first time a designated router on a sender's network is asked for data, the designated router informs the sender so the sender can start transmitting. When the designated router has no more listeners (receivers or routers forwarding data), the designated router informs the sender to stop transmitting. The designated router can thus control the transmitting of data by informing the sender to start and stop as listeners come and go. This is unique from conventional multicast protocols in that senders are always transmitting the multicast data on their network.

A novel feature of the present invention arises in creating multicast addresses that are used to find routes in order to add and remove branches from the distribution tree dynamically. This tree expansion and contraction is completely receiver initiated and allows data to only be sent onto networks including the sender's network when necessary. This provides for more efficient use of networks and router resources.

DETAILED DESCRIPTION OF THE INVENTION

Figure 1:
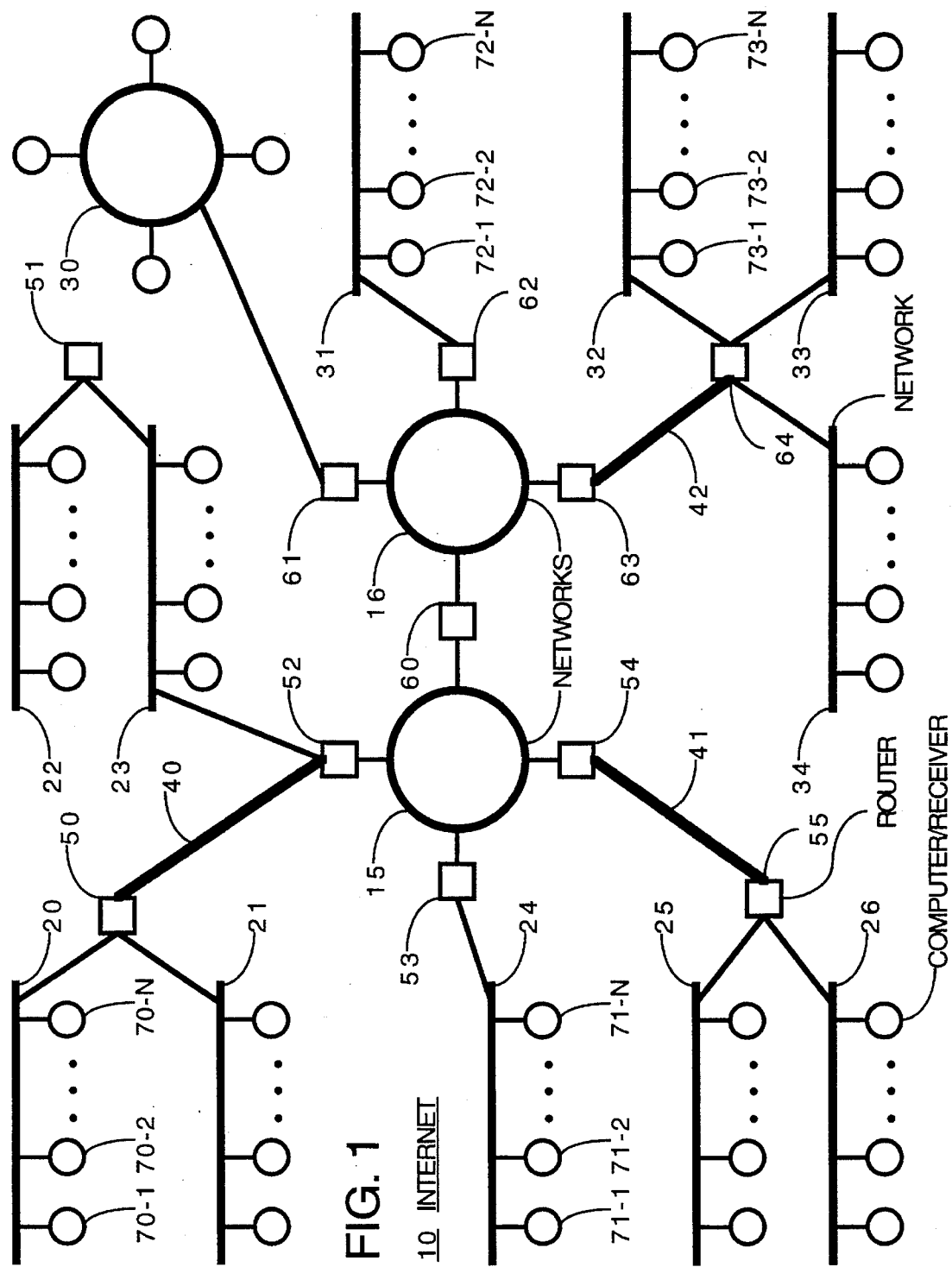
FIG. 1 is a block diagram of a computer internet consisting of multiple LANs interconnected by routers and capable of incorporating the present invention.

Referring now to FIG. 1, a block diagram 10 of a typical computer internet capable of implementing the present invention is illustrated. In this diagram, computers are illustrated as circles, for example computers 70-1, 70-2, through 70-N. Computers such as these, which are either senders or receivers, are referred to as endpoints. Computer routers are illustrated as squares, for example router 50. Routers are also referred to as nodes.

Computers 70-1, 70-2, through 70-N and router 50 are connected to a local area network (LAN) 20 which is a communication bus illustrated as a large bold line. Routers 60, 61, 62, and 63 are connected to a local area network (LAN) 16 which is a communication ring illustrated as a large bold circle. Routers 50 and 52 are connected by an intermediate network which might be a LAN or a wide area network (WAN) 40 which is a communication network illustrated as a diagonal bold line.

A single LAN is referred to as a network and multiple connected LANs are referred to as an internet. FIG. 1 illustrates multiple interconnected LANs or networks 15, 16, 20, 21, 22, 23, 24, 25, 26, 30, 31, 32, 33, 34, 40, 41 and 42. Each of the LANs is connected to adjacent LANs by a router. FIG. 1 illustrates routers 50, 51, 52, 53, 54, 55, 60, 61, 62, 63, and 64.

Figure 2:
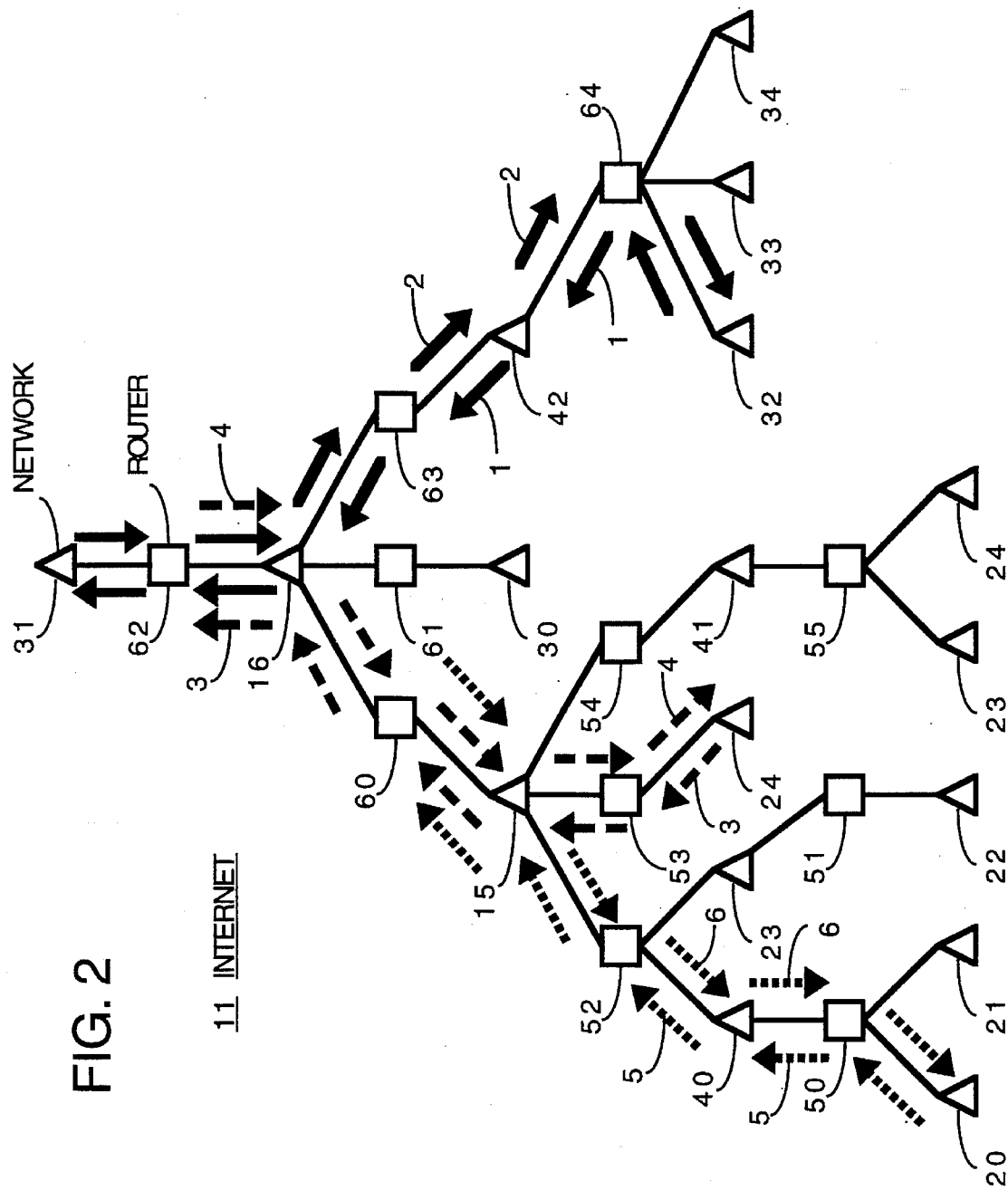
FIG. 2 is a tree diagram of the computer internet shown in FIG. 1.

FIG. 2 illustrates the receiver based construction of a multicast distribution tree 11 configured in accordance with the present invention. FIG. 2 illustrates the same internet 10 shown in FIG. 1, except as tree diagram 11. The tree diagram 11 only depicts the networks that are illustrated as triangles, for example network 31 in FIG. 1, and the routers that are illustrated as squares, such as router 62 in FIG. 1. In FIG. 2, receiver 73-1 on network 32 (FIG. 1) sends a request to router 64 that receiver 73-1 desires to receive multicast data from the source 72-1. Router 64 then sends a request to router 63, and router 63 sends a request to router 62 which sends a request to computer source 72-1 to start transmitting. These forwarded requests are denoted by solid arrows 1 going up the tree 11 towards network 31. The distribution tree 11 is built by reversing the path of these requests as denoted by the solid arrows 2 going down the tree 11 from the network 31 to network 32.

Similarly in FIG. 2, receiver 71-1 on network 24 sends a request to router 53 that it wishes to receive a transmission from source 72-1. Router 53 then sends a request to router 60, and router 60 sends a request to router 62. In this case, the request does not have to be sent to computer source 72-1 to start as computer source 72-1 is already transmitting. These forwarded requests are denoted by dashed arrows 3 going up the tree 11 towards router 62. New branches are added to the distribution tree 11 by reversing the path of these requests as denoted by the dashed arrows 4 going down the tree 11 from router 62 to network 24.

Similarly in FIG. 2, receiver 70-1 on network 20 sends a request to router 50 that it wishes to receive a transmission from source 72-1. Router 50 then sends a request to router 52, and router 52 sends a request to router 60. These forwarded requests are denoted by dotted arrows 5 going up the tree towards router 60. In this case the additional distribution path does not have to go all the way to the root router 62 because branches of the distribution tree 11 from the source 72-1 to router 60 are already in place. New branches are added to the distribution tree 11 by reversing the path of these requests as denoted by the dotted arrows 6 going down the tree 11 from router 60 to network 20.

Figure 3A:
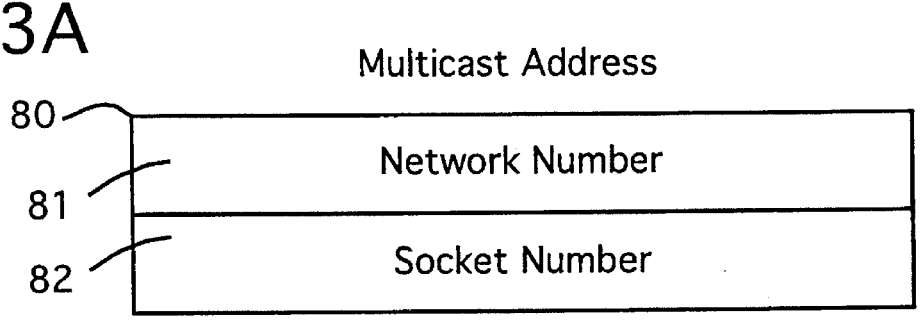
FIG. 3A is a representation of a multicast address configured in accordance with the present invention.

In accordance with the present invention, the assignment of multicast addresses and the maintenance of multicast distribution trees are performed by routers. As illustrated in FIG. 3A, a multicast address 80 consists of two parts, a network number 81 and a socket number 82. The network number 81 identifies the network on which the sender for the multicast group is located. Each network is assigned a unique contiguous range of network numbers that identifies the network. The network number 81 is arbitrarily picked from a range assigned to a sender's network. The socket number 82 is an arbitrary number used merely to provide a unique multicast address for identifying a specific sending source on a network. The network number 81 is assigned previously by an outside party, but the socket number 82 is generated by the designated router during the creation of a multicast address.

The first multicast address 80 is used to create a second multicast address for sending the data on network layer datagrams. The second multicast address may be a data link layer multicast address or a network layer multicast address. The second address is supplied to the network layer when a node 92 is sending packets in network layer datagrams. The second address is also supplied to the network layer when a node 92 wishes to receive data for the first multicast address 80. In either case if the second multicast address is smaller than the first multicast address 80 then the first multicast address 80 must be mapped into the second multicast address using a hashing algorithm which may be simply truncating the first multicast address 80 to the same number of bits as the second multicast address. If the second multicast address is larger than the first multicast address 80 then the first multicast address 80 may be mapped into the second multicast address by padding the first multicast address 80 with enough bits set to zero to make it the same length as the second multicast address. If the first multicast address 80 was truncated to form the second multicast address then packets received from the network layer may contain data with a transport layer multicast address 80 that the node 92 does not want to receive. In this case the node 92 must filter the packets received and discard the packets which contain a transport layer multicast address 80 which was not wanted.

Figure 3B:
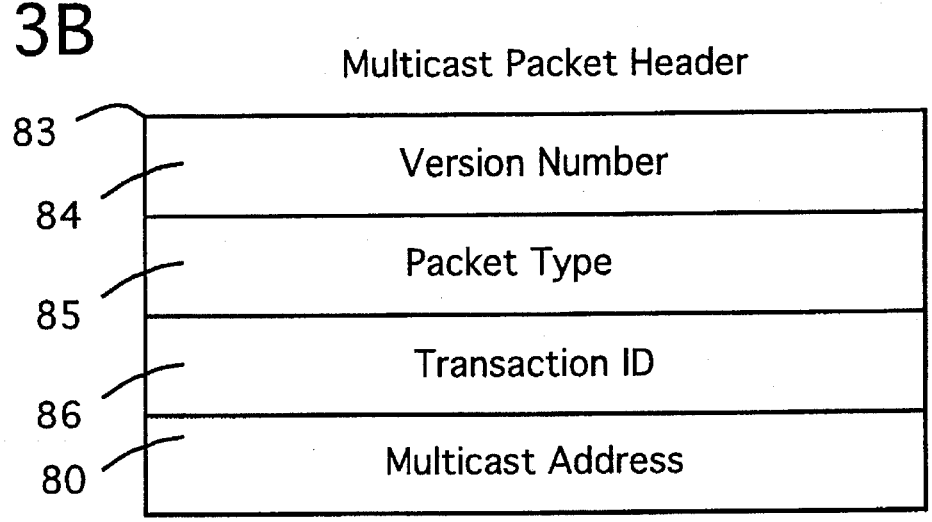
FIG. 3B is a block diagram of a multicast packet header that includes the multicast address shown in FIG. 3A.

As illustrated in FIG. 3B, a multicast routing protocol header 83 consists of four parts, a version number 84, a packet type 85, a transaction ID 86, and the multicast address 80 shown in FIG. 3A. The version number 84 is used to distinguish compatible versions of the multicast routing protocol. The packet type 85 is used to denote the type of multicast packet, for example, a join request packet, a join confirm packet, or a data packet. The transaction ID 86 is used to match transaction responses with transaction requests. The multicast address 80 is used to indicate to which multicast group the packet belongs. All of the multicast protocol packets of this invention share this header format.

On each network one router is designated as the designated router responsible for managing the multicast addresses on that network. When a multicast sender needs a multicast address 80, the multicast sender multicasts the request to all routers on its network for a multicast address. Only the designated router on the network responds to this request. The designated router keeps a list of multicast addresses it has assigned to senders on its network and creates a new address using a socket number 82 that is not in use in conjunction with a network number 81 assigned to the network. The designated router then gives this address to the requesting sender. The sending computer uses the multicast address to transmit multicast data, and the sending computer informs the designated router when it no longer needs the address. The router then removes this address from its list so that the address may be reassigned in the future.

Figure 3C:
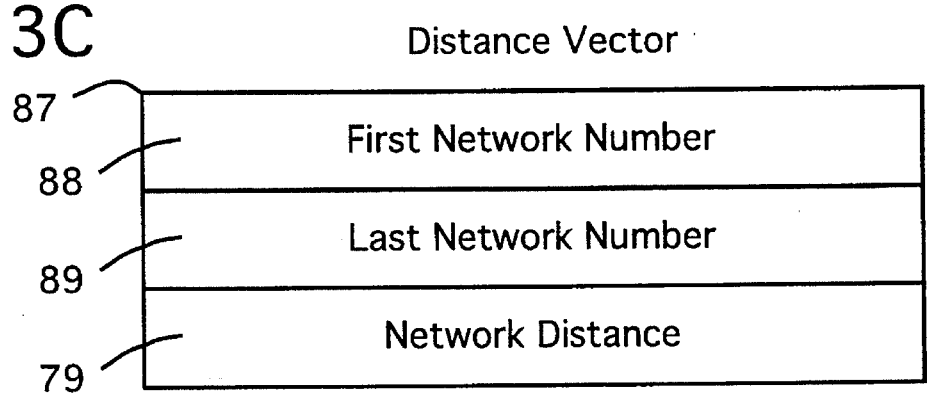
FIG. 3C is a block diagram of a multicast distance vector.

FIG. 3C illustrates a distance vector 87 which consists of the first network number 88, the last network number 89, and the network distance 79. Distance vector packets contain one or more distance vectors 87. The network number range for the network starts with the first network number 88 and includes all network numbers up to and including the last network number 89.

Figure 4A:
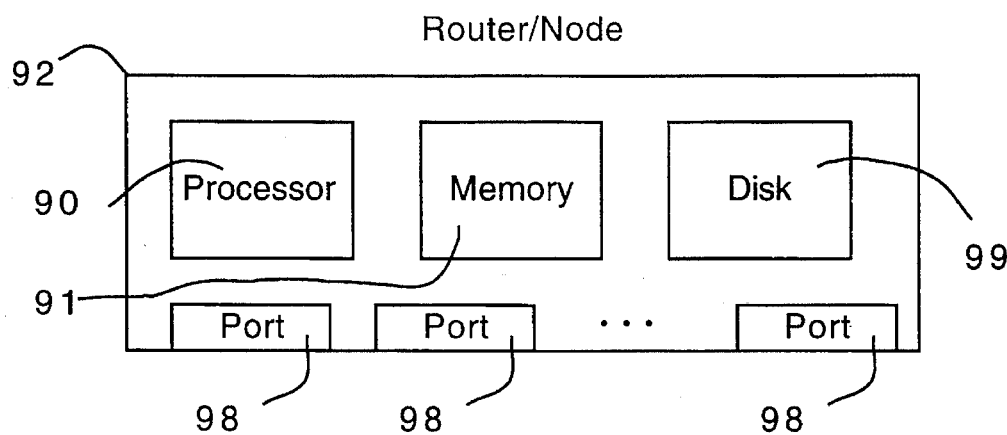
FIG. 4A is block diagram of a router capable of incorporating the present invention.

FIG. 4A illustrates a router 92 which consists of a processor 90, memory 91, disk 99, and at least one port 98. The processor 90 executes the method which comprises this invention. The memory 91 is used to store tables utilized by this method. The disk 99 is used to store permanent configurations utilized by this method. Ports 98 are used to connect the router to networks.

Figure 4B:
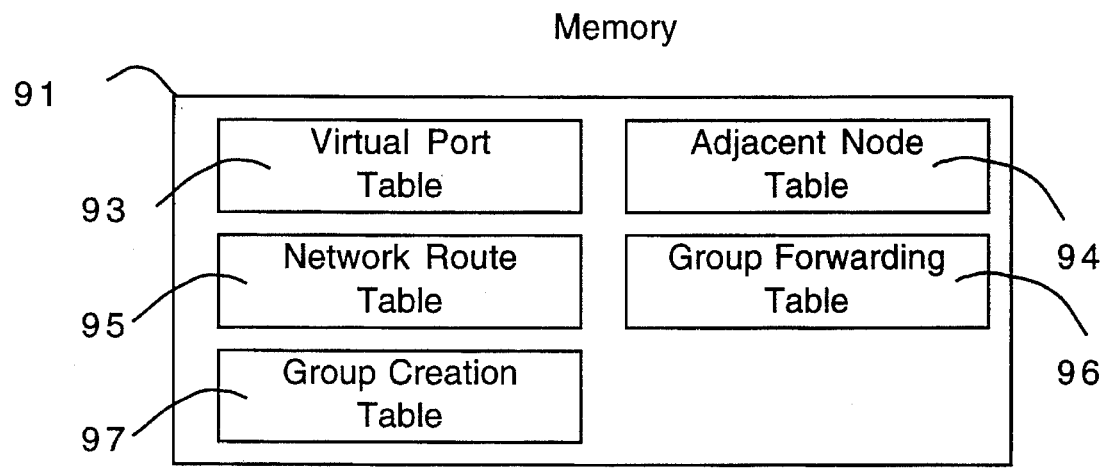
FIG. 4B is block diagram of the router memory configured in accordance with the present invention.

FIG. 4B illustrates the memory of a router or node 92 configured in accordance with the present invention. Each node 92 maintains a virtual port table 93, an adjacent node table 94, a network route table 95, and a group forwarding table 96. A designated router, such as illustrated router 92, also maintains a group creation table 97.

Each node 92 maintains a virtual port table 93. An entry is configured for this table for every network layer type that is used by each network port 98. Each entry defines a local area network and the network layer protocol to which the node 92 is connected. Each entry is initialized with the network layer unicast address of the port for the node. The network number range for the port must be initially configured by a network administrator. Each network on the internet is assigned a unique range of network numbers.

Each node 92 maintains a adjacent node table 94. An entry is made in the adjacent node table 94 every time an adjacent node is discovered on a port 98 of the node 92. The address in the entry is set to the network layer unicast address of the adjacent node.

Each node 92 maintains a network route table 95. The network route table 95 describes the relationship between the node 92 and each local area network on the internet. The node 92 eventually allocates an entry in the network route table 95 for every network on its internet. The network is identified by the network number range that is used to generate group addresses on that network. Node 92 initializes the network route table 95 with entries for each network known from the virtual port table 93. Nodes initialize the distance in the entry to zero and initialize the network number range and network layer unicast address from the corresponding virtual port table entry. The distance is strictly the number of hops or intermediate networks between the node and the network.

Nodes maintain a parent node address in the entry for each entry in the network route table 95. Nodes initialize the parent node address to the network layer unicast address of the node for each network port 98. For networks to which a first node is not directly connected a parent node is defined as the adjacent node, in relation to the first node, that is one hop closer on the distribution tree to the source network. A child node is defined as an adjacent node that is one hop farther from the source network.

Nodes 92 allocate new entries for the network route table 95 for every network number range that is discovered by receiving a distance vector packet. The distance vector packet contains distance vectors 87. The node 92 from which the distance packet was received becomes the parent node for the new network. In this case nodes set the parent node address to the network layer unicast address of the node which was the source of the distance vector packet. Nodes use the network range from the distance vector packet to initialize the entry and the distance from the distance vector packet incremented by one.

Nodes update entries for the network route table 95 when a distance vector packet is received for a network number range and a shorter distance 79 to that network is discovered. In this case nodes replace the parent node address in the entry by the network layer unicast address of the node which was the source of the distance vector packet and set the distance from the distance vector packet incremented by one.

Each node 92 also maintains a group forwarding table 96. This group forwarding table 96 describes the relationship between the node 92 and the distribution tree for each group on the internet. A node has an entry in this table for every group for which the node is forwarding data. Each entry contains the parent branch for the group and any existing child branches for the group. When data for a group arrives on a parent branch of the group it is forwarded to each child branch.

A node 92 allocates a new entry in the group forwarding table 96 for a group when it tries to join the distribution tree 11 for that group. The node 92 sets the state of the entry to a joining value and sets the parent branch to the index of the port of the parent node in the virtual port table 93. The node 92 also sets a child branch in the entry to the index of the port of a joining node or a joining endpoint if that port is not already in the list. An endpoint is a non-routing source or destination of multicast packets. The node 92 sets the parent node address in the entry to the network layer unicast address of the parent node and the child node addresses to the network layer unicast addresses of child nodes. A node disposes of an entry when it leaves the distribution tree for the group.

Each designated node maintains a group creation table 97 that is used to track group addresses that have been assigned by the designated node 92. A designated node 92 allocates new entries for the group creation table 97 for group addresses that it assigns when it receives create group packets. The designated node 92 sets the group address in the entry to the assigned group address. The designated node 92 sets the creator address in the entry to the network layer unicast address of the requesting endpoint and a creator port index to the index of the port of the requesting endpoint. A designated node 92 disposes of an entry when it receives a delete group packet for the group.

Multicast control packets are exchanged using a multicast transaction protocol which allows routers and endpoints to execute transactions in a manner that does not require either routers to know the state of specific endpoints or endpoints to know the state of specific routers. Two special multicast addresses 80 are designated as the all routers multicast address and the all endpoints multicast address. Endpoints send requests to a router 92 using the all routers multicast address and routers 92 send requests to endpoints using the all endpoints multicast address.

Nodes 92 start a timer when sending request packets and if no confirm or reject packet is received in the allotted time interval then the request is transmitted again. Configured parameters set the values of the time interval and the number of retransmissions. If no confirm or reject packet is ultimately received then the transaction is treated as if a reject packet was received. A reject packet of this type is then returned on the reverse path as needed.

The designated node 92 is responsible for allocating group addresses. Each local network must have a designated node 92. When a node 92 starts up it first tries to become the designated node. These negotiations are accomplished with transactions and are initiated by a designated node request packet. No response to the request indicates that the negotiation succeeded. A negative response indicates that the negotiation failed. No other type of response is allowed. If two nodes try to become the designated node at the same time then the node with the lower network layer unicast address for that network becomes the designated node.

Each node 92 must keep track of the state of its adjacent nodes. This is accomplished by requiring all nodes to send out hello packets periodically on each network port 98 and requiring each node to notice if a hello packet is not received from an adjacent node in a certain interval of time. Hello packets must also be sent out on each network port 98 whenever the state of the node 92 changes to a different operational state.

Each node 92 maintains an entry in the adjacent node table 94 for each adjacent node. This entry is allocated the first time it receives a hello packet from the adjacent node. The time of the most recent hello packet from the adjacent node and its state are maintained in the adjacent node table 94.

If adjacent nodes are not heard from for a configured interval then their state is changed to non operational and the network route table 95 is examined. The state for every range in the network route table 95 for which one of these adjacent nodes is the next hop is changed to unreachable. Distance vector request packets are then sent to each remaining adjacent node for the affected address ranges.

When a node 92 receives a hello packet it must check to see if the state of the adjacent node has changed. If the node state was non-operational then it commences to get that node's network route entries by sending a distance vector request packet to that node.

The nodes 92 must build a spanning tree in order to communicate with each other. To accomplish this at startup and when routes change each node sends a distance vector request packet to every adjacent node. This initially contains a vector for each entry in the network route table 95. As many packets as necessary are sent in order to send all the vectors. Also when routes change each node sends a distance vector request packet to every adjacent node except the node that was the source of the change.

When a distance vector request is received by a node 92 then entries for unknown network ranges are added to its network route table 95 with a distance of that in the vector plus one. For known network ranges if the distance in the vector plus one is less than that in the node route table 95 then the entry is updated. Also a tie breaker is used for adjacent nodes with the same distance to a network range. The node with the higher network layer unicast address becomes the parent node for the network range.

When an endpoint wishes to send data to a group it sends a create group request packet to the all of the nodes on its local net. The designated node responds to this request. This node becomes the creator node of the group and assigns an unused group address. A creator node is the designated node that created a multicast group. The creator node allocates a group creation table entry for the group. Then the creator node returns the group address to the creator endpoint in a create group confirm packet. The creator endpoint is the endpoint that requested creation of a multicast group and the source of data forwarded to the multicast group.

As endpoints join a group the distribution tree 11 is built up for that group. When an endpoint wishes to join a group it sends a join group request packet to all of the nodes 92 on its local net. If the parent node for the group on the network is already forwarding data for this group on this network then the parent node returns a join confirm packet immediately. When the parent node for the group gets a join group request packet and it is not yet a member of the group, the parent node forwards the packet towards the creator node of the group. It then adds the group to the group forwarding table 96 with a state of joining. The network number part of the group address is used to find the parent node in the network route table 95 to forward the join group request packet towards the creator node of the group.

Each node 92 on the joining path sets the state in its group forwarding entry to joining and the parent node to the unicast address of its parent node and sets a child node in the entry to the unicast address of the downstream node. Eventually the packet will either reach a member node or the creator node for the group and a join group confirm packet will be sent back along the reverse path. This member or creator node adds the port of the reverse path to its list of child ports for the group. When the creator node receives its first join request packet for a group it forwards this packet to the creating endpoint to signal it to start multicasting. Nodes receive and forward the join group confirm packet back on the reverse path towards the joining endpoint. Also each node sets the network port of the parent node in the entry to the network port of its parent node and sets a network port of a child node in the entry to the network port of the downstream node if the port is not yet on the list.

If a join group request packet is received while the group is in the joining state then only a new child node is added. When the join group confirm packet is received it is forwarded back to each child node for the group. If a node receives a join group request packet while the group is in the leaving state, then a join group reject packet is returned with an error indication. If a join group reject packet is received with an error indication then the packet is forwarded back along the reverse path or paths and the entry is removed from the group forwarding table of each joining node.

When an endpoint wishes to send data to a group which it has created it must wait until it receives a join request from its creator node. An endpoint then sends packets using the multicast address 80 on the local net of the endpoint until the endpoint receives a leave request from its creator node. The endpoint may continue to receive join and leave requests from its creator node signaling the endpoint to start multicasting data again and to stop multicasting data again. Other member endpoints on the local net will receive these packets without any forwarding. Parent nodes on the local net will also receive this multicast data and forward the packets to all their child ports in their forwarding tables for the group. A node multicasts a packet on a local net only if it is the parent node for the group on that local net.

When a member endpoint wishes to leave a group it sends a leave group request packet to all of the nodes on its local net. Only the parent node for the group on its local net responds. A leave group confirm packet is returned to the endpoint. If the parent node has no child nodes for the group then it sends out a group member query packet on each child port. If it does not get a group member confirm packet on a child port then it removes that port from the entry. If it has no child ports left in the entry it sets the state of the entry to leaving and sends a leave group request packet to its parent node. It removes the entry from its group forwarding table when it receives the leave group confirm packet. Likewise, when a node closer to the creator node receives a leave group request packet from a child node it leaves the group if it has no more child nodes and child endpoints. Eventually the creator node itself may have no more child nodes due to all of them leaving. In this case the creator node sends a leave group request packet to the creating endpoint to signal it to stop multicasting.

The creator node for the group receives a delete group request packet when a creator endpoint wishes to delete the group. A delete group request packet is forwarded to each child node and child endpoint for the group and the state of the group forwarding entry is set to deleting. Each child node does the same thing.

A delete group request packet may pass a join group confirm packet for a given group. In all cases response packets arriving for a non-existent group are ignored. Join group request packets which arrive for a non-existent group at what should be the creator node for a group based on the group address will cause the node to send join group reject packets indicating no such group exists.

To detect disappearing members parent nodes periodically send a group member query packet for each group which has no child nodes. Each child endpoint which is a member of the specified group returns a group member confirm packet to the parent node. If after a configured number of retries no group member confirm packets have been received by the parent node then the node sends a leave group request packet to its parent node and deletes the group entry as described above in the section on leaving groups.

In order to detect stranded groups, a creator node periodically sends a group creator query packet to the creator endpoint. If after a configured number of retries no group creator confirm packet has been received by the creator node, then the group is deleted as described above in the section on deleting groups.

Network route tables 95 are kept up to date by nodes sending multicasting distance vector packets to their adjacent nodes when routes change. This allows nodes to change multicast group routing based on changes in topology. When the parent node for a network range changes to a new parent node then the group routing table is searched for groups in this network range. For each group whose parent node matches the old parent node a leave group request packet is sent to the old parent node and the state of the group is set to leaving. When the leave group confirm packet is received from the old parent node then a join group request packet is sent to the new parent node and the state of the group is set to joining. When the join group confirm packet is received from the new parent node then the parent node for the group is set to its unicast address and the state of the group is set to forwarding. Nothing has to be done for child nodes as they take care of themselves in the same manner by updating their routes to their parent nodes. Parent nodes for child endpoints are not affected by these changes.

Figure 5:
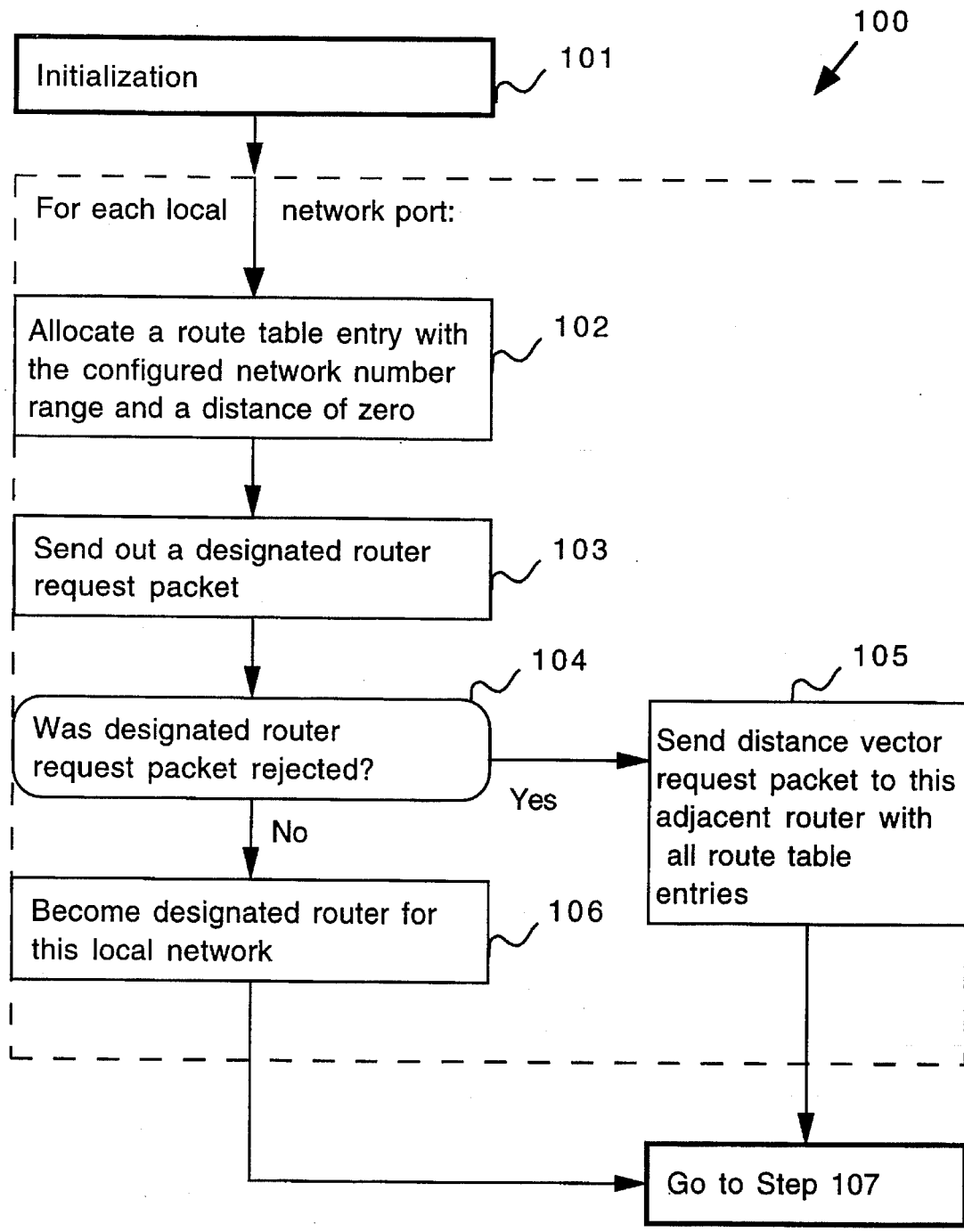
FIG. 5 is a flow diagram of the initiation procedure of the multicast routing protocol of the present invention illustrated in FIGS. 6–12.

In light of the above discussion, FIGS. 5–12 make up a flow chart illustrating the steps of executing the routing protocol of the present invention. Referring first to FIG. 5, the basic initialization procedure is illustrated. Beginning at step 101 and moving towards step 102, the method of the present invention begins by initializing each local network port by allocating a route table entry with the configured network number in step 102. At step 103 the system determines the designated router for each network by sending out a request packet. In step 104 the receiving router becomes a designated router in step 106 if the request is not rejected,. If the request is accepted, then in step 105 a distance vector request packet is sent to the adjacent router with all table entries. The system then proceeds to step 107 to wait for a transaction event in FIG. 6.

Figure 6:
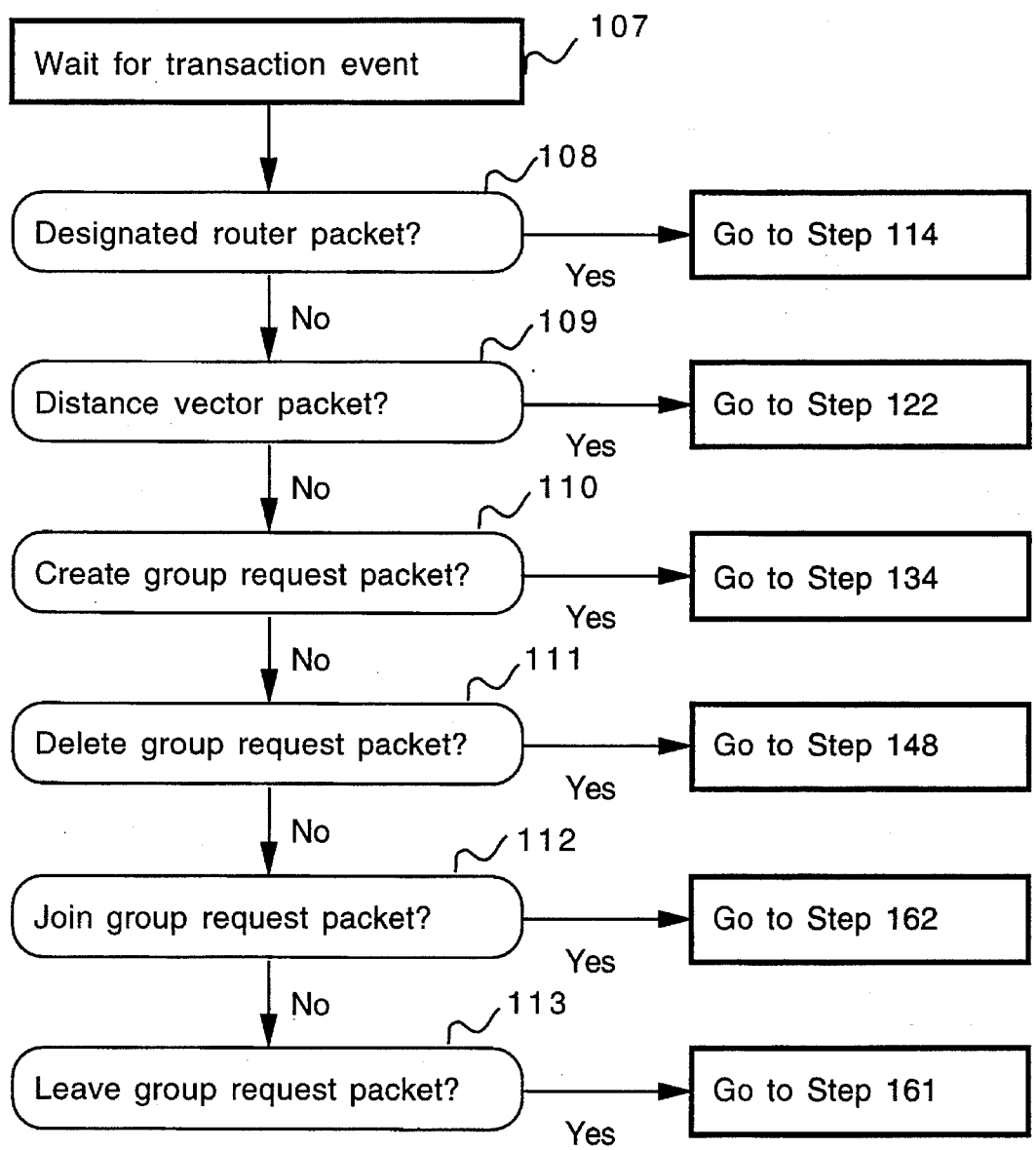
FIG. 6 is a flow diagram illustrating the upper-level routines of the routing protocol of the present invention.

After the initialization procedure of the networks routers, FIG. 6 illustrates each of the basic steps in the method that a router goes through in responding to the basic transaction requests and responses from other routers and end points on networks to which it is directly connected. Each router initially waits for a transaction event in step 107, then in step 108 the system first determines if the event is a designated router packet, in step 109 it is determined if the event is a distance vector packet, step 110 determines if the event is a create group packet, step 111 determines if the event is a delete group packet, step 112 determines if the event is a join group packet, and step 113 determines if the event is a leave group packet. The steps following each of these major determination steps will be illustrated in more detail in the following figures.

Figure 7:
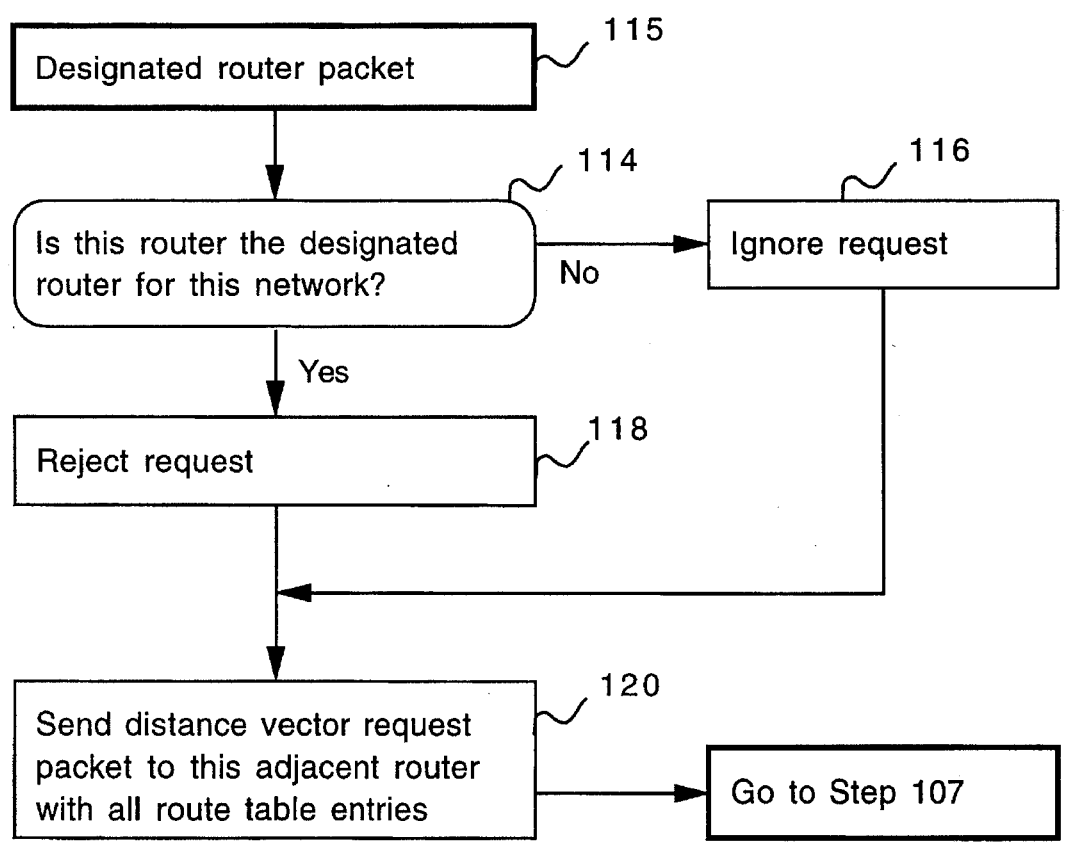
FIG. 7 is a flow diagram showing steps of the designated router packet routine in more detail.

FIG. 7 illustrates a more detailed flow diagram of the designated router transaction. Beginning at step 114, the system determines if the receiving router is the designated router for this network. If that router is not designated, then the router ignores the request at step 116, but if affirmative the router rejects the request at step 118. Whether the router is designated or not, the system at step 120 sends a distance vector request to the adjacent router with all of its route table entries. The system then proceeds to the distance vector packet step 109.

Figure 8:
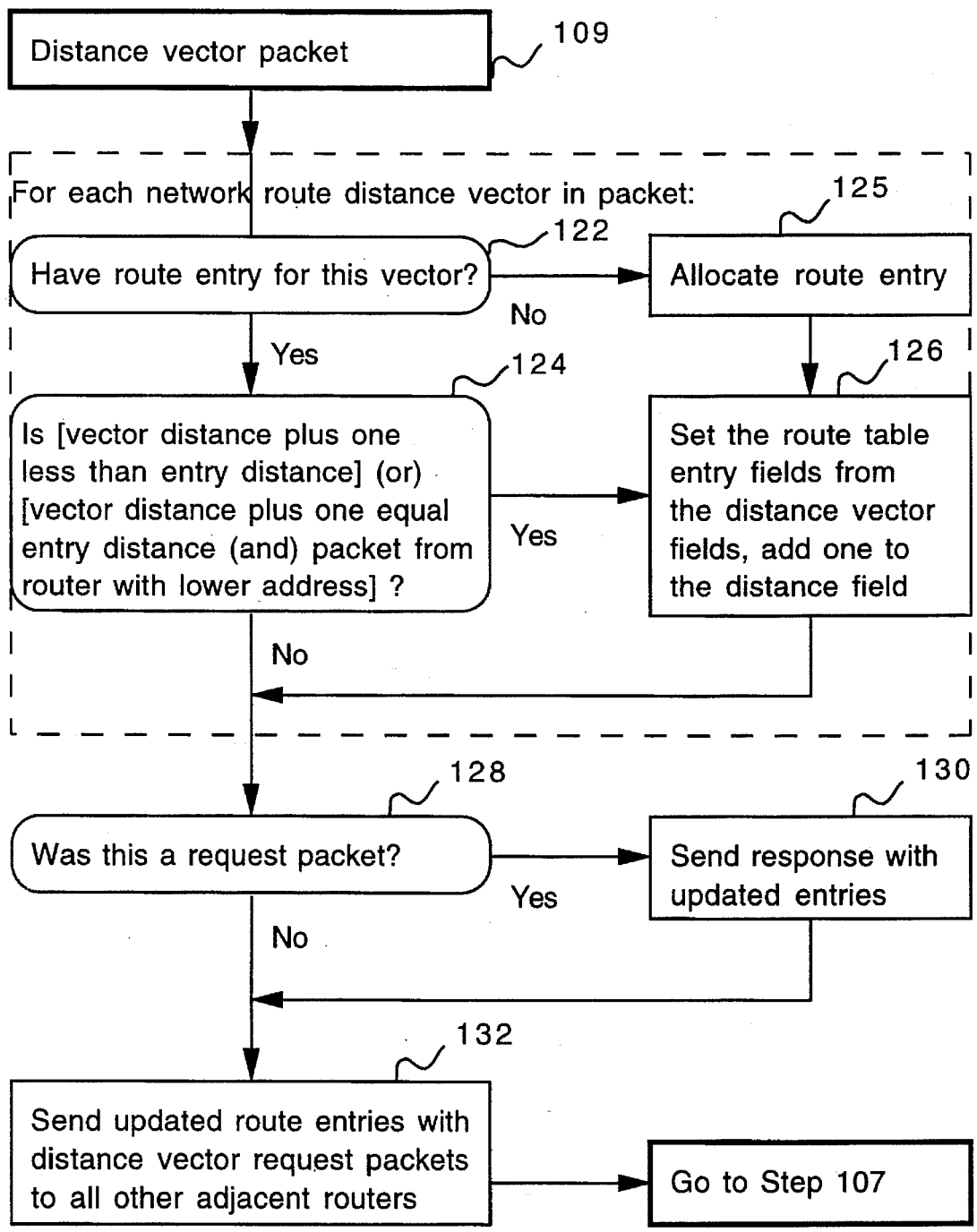
FIG. 8 is a flow diagram showing steps of the distance vector packet routine in more detail.

FIG. 8 illustrates the distance vector packet transaction of step 109, wherein the system for each network route distance vector in the packet first determines in step 122 if there is a route entry for this vector. If the determination is affirmative, then the system moves to step 124 to determine if the vector distance is within the entry distance criteria, and if there is no route entry, then the system allocates a route entry at step 125. From step 125 or if an affirmative determination in step 124, the system sets the route table entry fields from the distant vector fields in step 126. If there is a negative determination in step 124 or after step 126, then the method of the system moves on to step 128 to determine if it was a request packet. If so, then a response is sent with updated entries in step 130, and if it is not, step 130 is omitted. Next in step 132, updated route entries are sent with distant vector request packets to all adjacent routers except the one that sent this distance vector packet. The method then moves on to the create group request packet in step 110.

Figure 9:
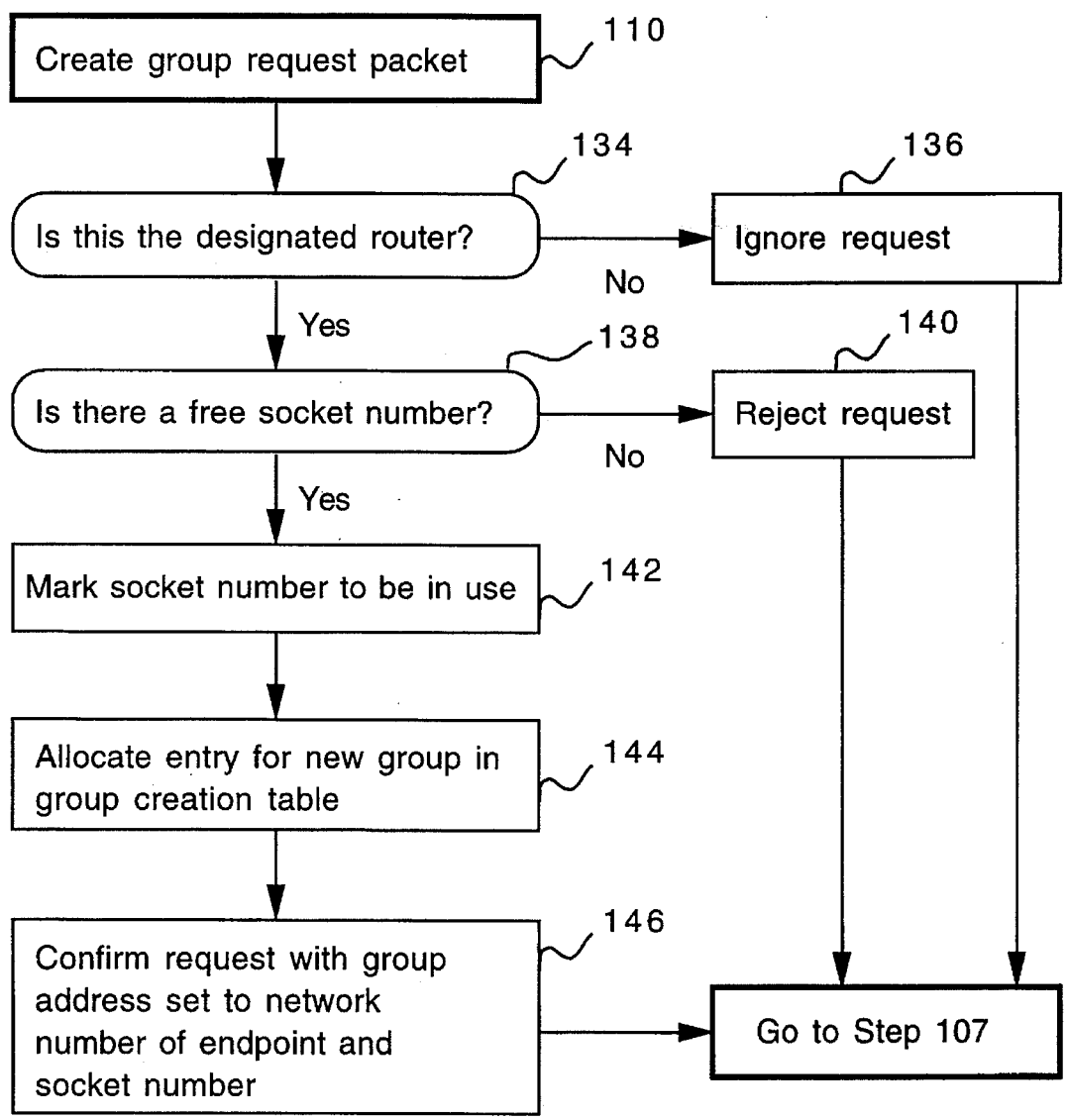
FIG. 9 is a flow diagram showing steps of the create group request packet routine in more detail.

FIG. 9 illustrates the create group transaction at step 110. The system first determines at step 134 whether the router is the designated router for the network, wherein if it is not the system bypasses the create group request for this router in step 136, but if affirmative then moves on to step 138 to determine if there is a free socket number. If there is no free socket number then the system moves to step 140 and omits the create group step, but if there is a free socket number then it moves to step 142 to mark the socket number to be in use and then in step 144 to allocate an entry for the new group in the group creation table. Finally in step 146 the system confirms the request with the group address generated from a network number of the router and the socket number. The method then moves on to the delete group request packet in step 111.

Figure 10:
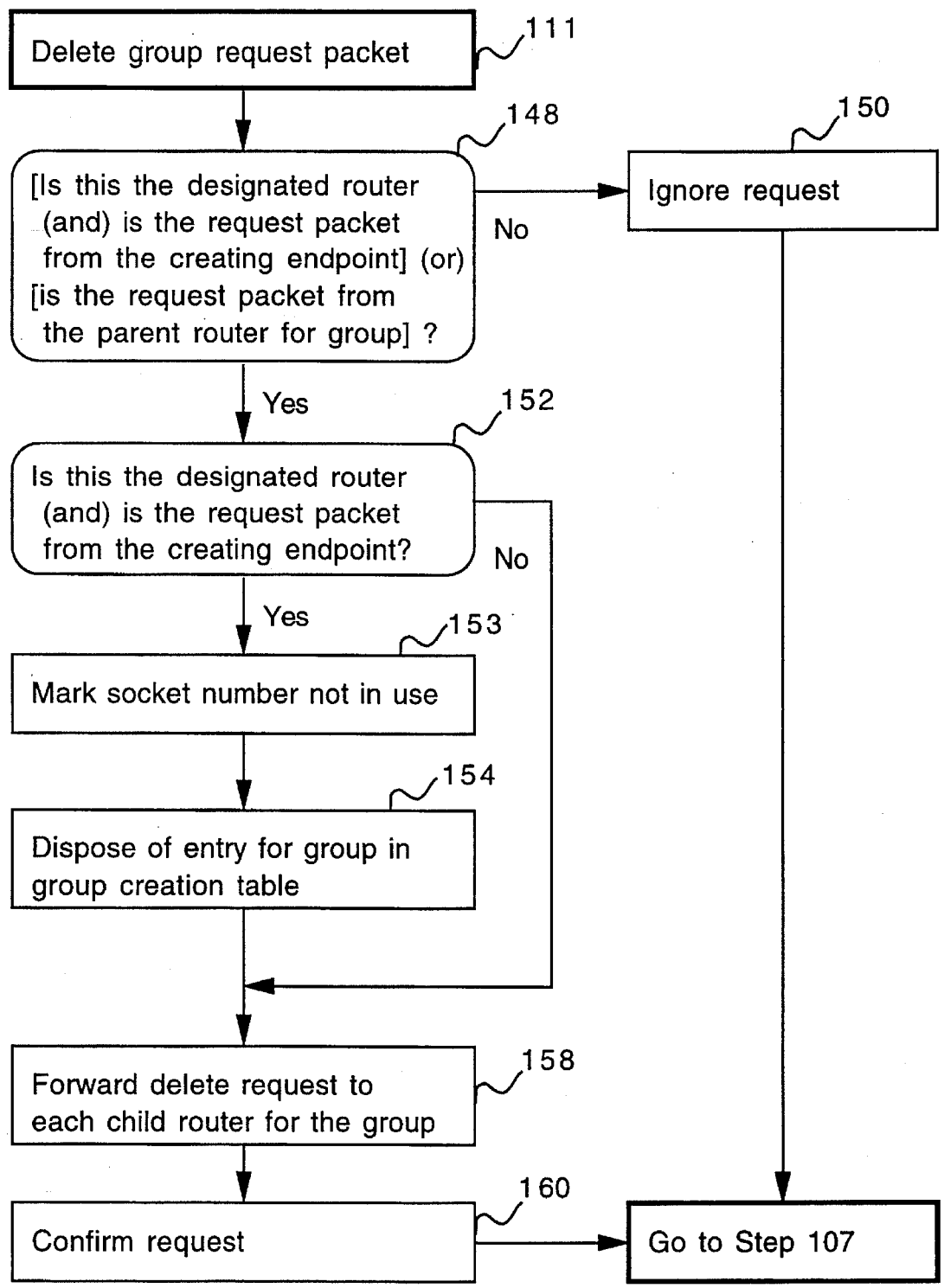
FIG. 10 is a flow diagram showing steps of the delete group request packet routine in more detail.

FIG. 10 illustrates the delete group transaction of step 111, where in step 148 the system determines if the router is the designated router for the network and if the request came from the creating endpoint or if the request came from the parent node for the group, and ignores the delete group routines if the system determines in the negative in step 150. If it is in the affirmative, then in step 152 the system determines if the router is the designated router and if the request came from the creating endpoint. If the determination is negative, the system skips to step 158 to forward a delete request to each child router for the group, but if the determination in step 152 is affirmative, then in step 153 the socket number is marked not in use and in step 154 the entry is removed from the group creation table. In step 160 the request is confirmed and the method moves on to join group request packet step 112.

Figure 11A:
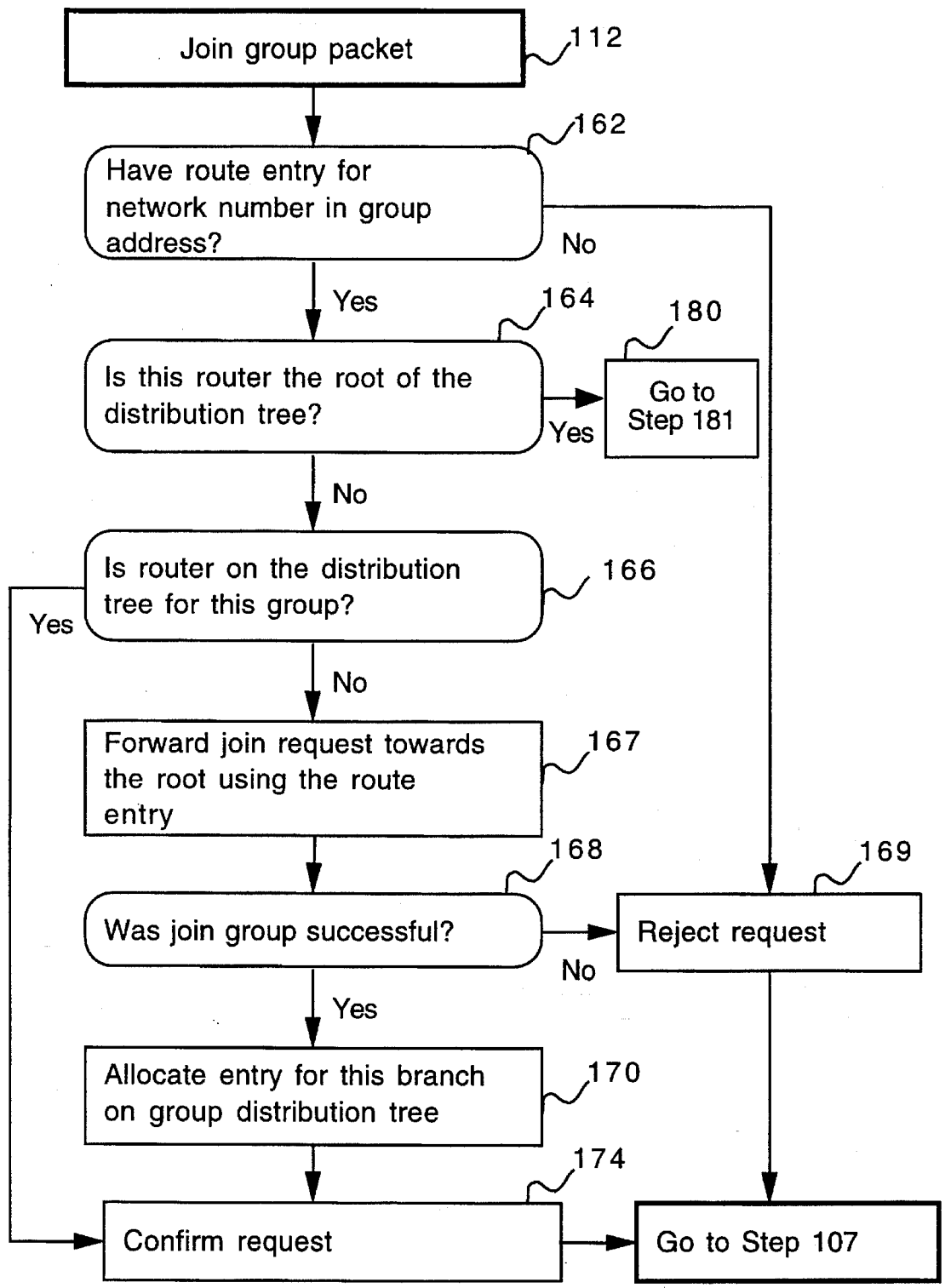
FIG. 11A is a flow diagram showing steps of the join group packet routine in more detail.

The join group request transaction step 112 is illustrated in FIG. 11A, wherein at step 162 the system determines if there is a route entry for the network number in the group address. If negative the join group request is terminated, but if affirmative, it is determined at step 164 if the router is the root of the distribution tree. If affirmative in step 164, the system moves to step 181, but if negative then at step 166 a determination is made as to whether the router is on the distribution tree for this group. If affirmative in the determination at step 166 then the request is confirmed at step 174, but if negative then at step 167 a join request is forwarded towards the root of the distribution tree using the route entry. From step 167 to 168 a determination is made as to whether the group is joined successfully, if not then the request is rejected at step 169. If the group is joined successfully at step 168 then at step 170 an entry is made for this specific branch in the group distribution tree in the group forwarding table. After step 170 the request is confirmed at 174 and the method moves on to the leave group request packet step 113.

Figure 11B:
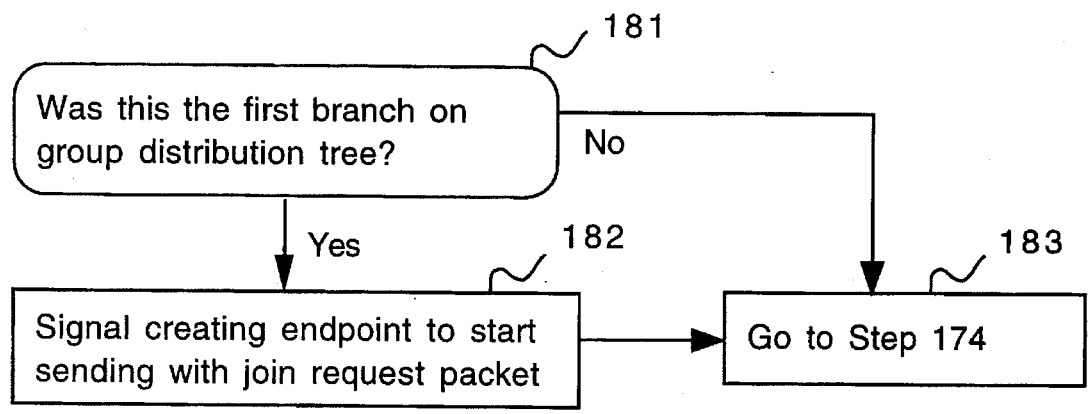
FIG. 11B is a flow diagram showing steps of the join group packet routine in more detail for a creating router.

FIG. 11B starts with step 181 which was reached if a positive determination was made in step 164. In step 181 a determination is made as to whether this was the first branch on the distribution tree for this group. If the determination was negative the system immediately confirms the request in step 174, but if positive then at step 182 the router sends a join request packet to the sending endpoint to signal it to start transmission. After step 182 the request is confirmed at 174 and the method moves on to the leave group request packet 113.

Figure 12A:
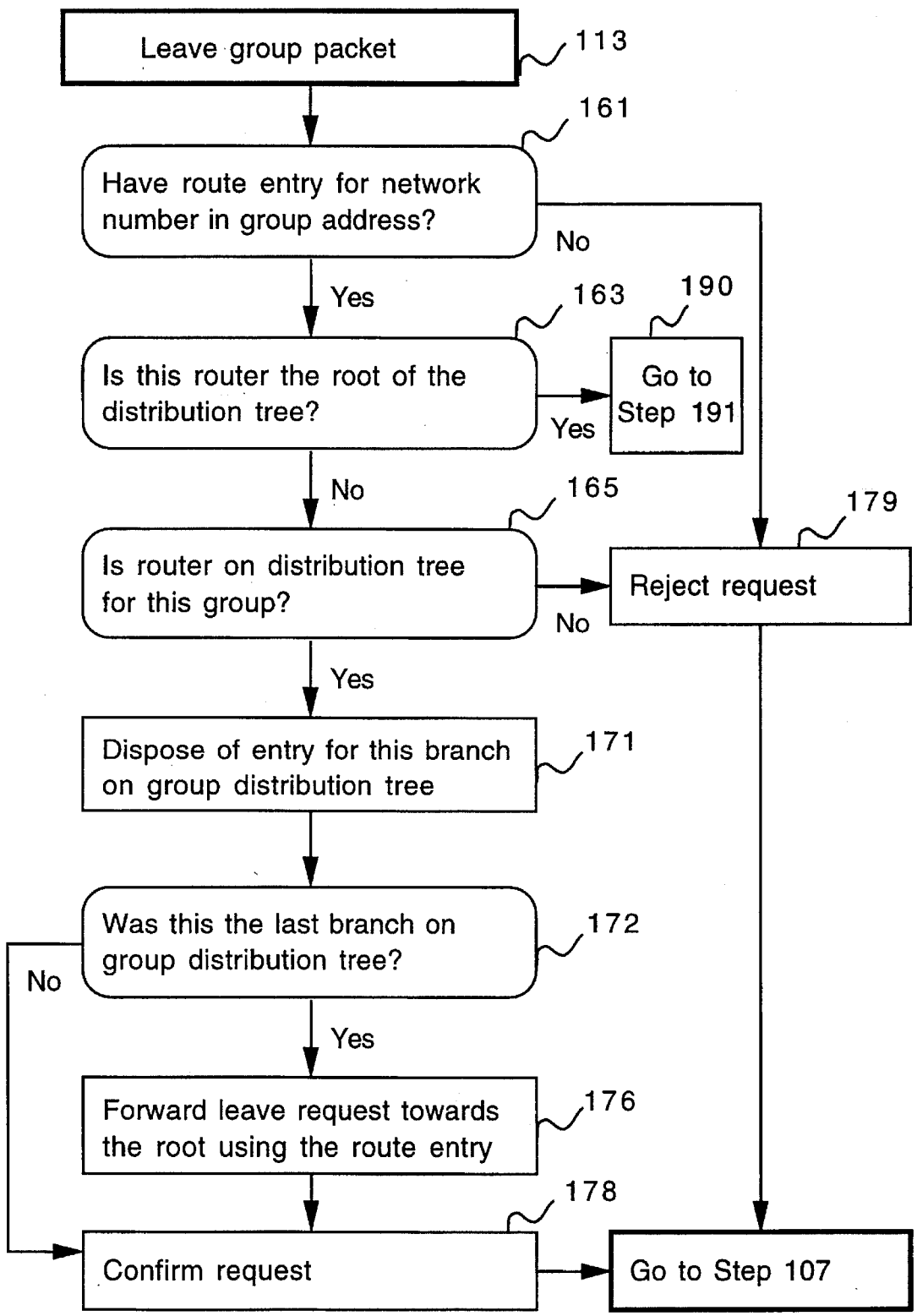
FIG. 12A is a flow diagram showing steps of the leave group packet routine in more detail.

FIG. 12A illustrates the leave group request transaction step 113. In this routine at step 161 the system determines if there is a route entry for the network number in the group address, and if negative, the request is terminated at step 179. If affirmative, then at step 163 the system determines if the router is the root of the distribution tree. If affirmative the method moves to step 191, but if negative the system goes to step 165 to determine if the router is on the distribution tree for this group. If the determination is negative at 165, then the request is rejected at 179, but if affirmative then at step 171 an entry is made for this branch in the group distribution tree. Following step 171 it is determined if this is the last branch of the group distribution tree in step 172, and if negative, the request is confirmed in step 178, but if affirmative, then at step 176 a leave request is forwarded toward the root of the distribution tree using the route entry. Afterwards the request is confirmed in step 178 and this portion of the method is completed.

Figure 12B:
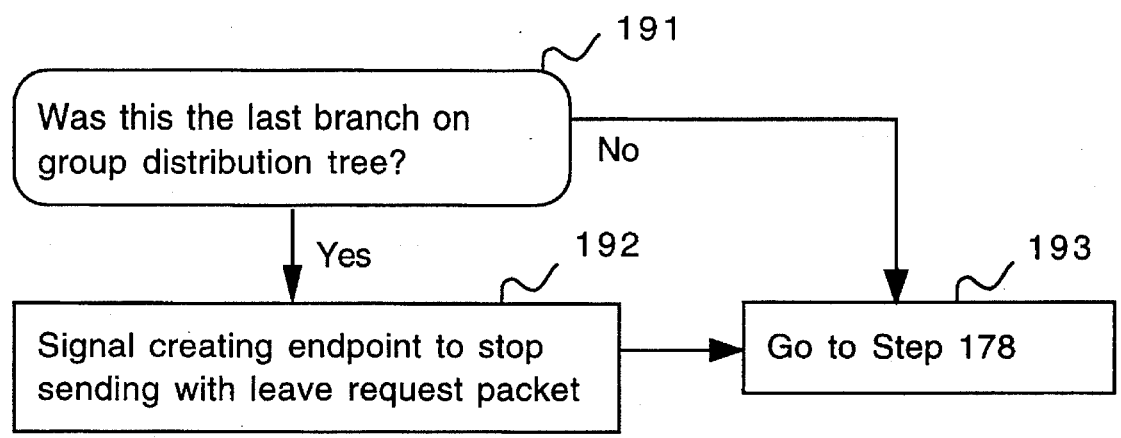
FIG. 12B is a flow diagram showing steps of the leave group packet routine in more detail for a creating router.

FIG. 12B starts with step 191 which was reached if a positive determination was made in step 163. In step 191 a determination is made as to whether this was the last branch on the distribution tree for this group. If the determination was negative the system immediately confirms the request in step 178, but if positive then at step 192 the router sends a leave request packet to the sending endpoint to signal it to stop transmission. After step 192 the request is confirmed at 178 and this portion of the method is completed.

Figure 13:
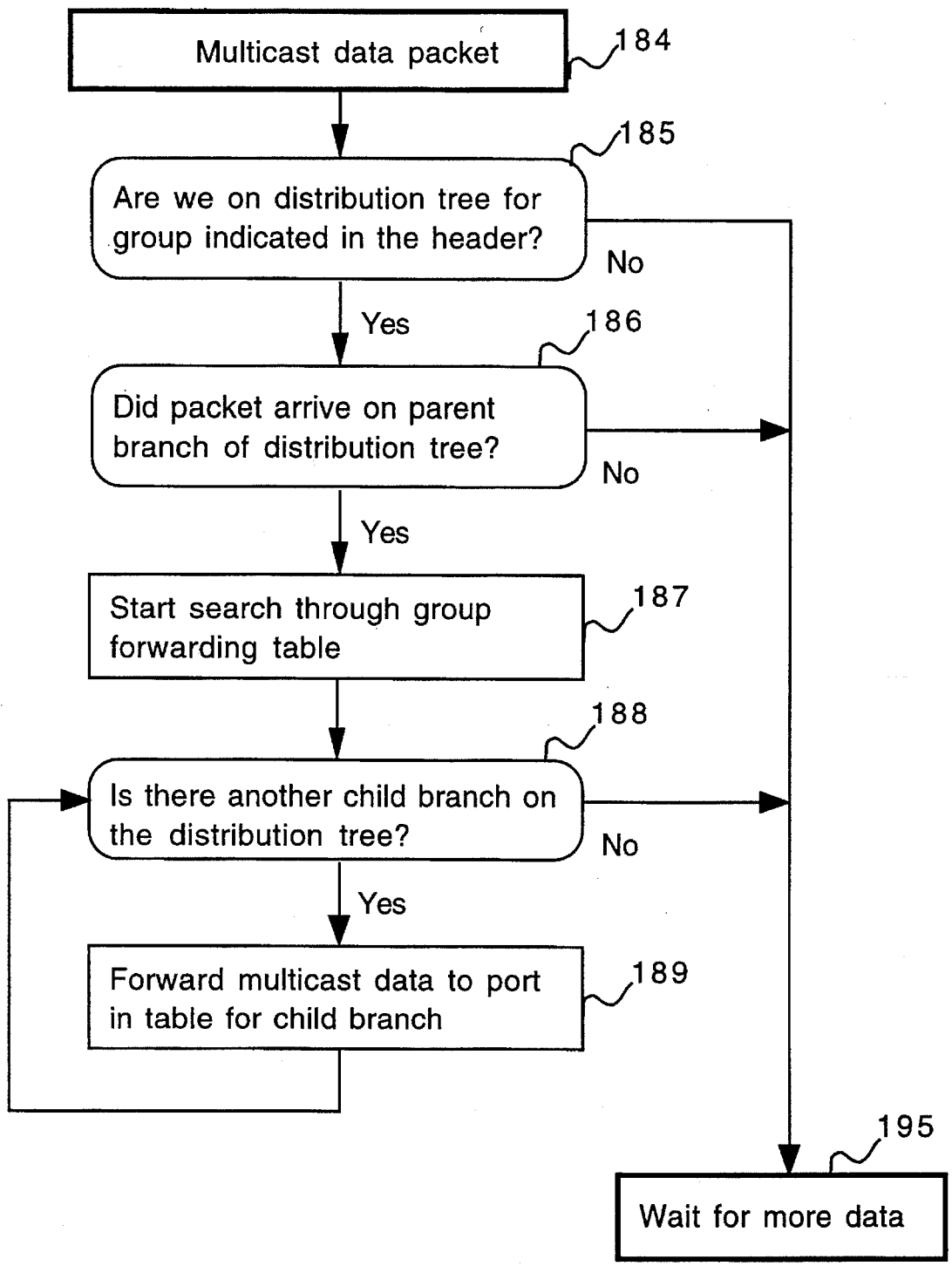
FIG. 13 is a flow diagram showing steps for forwarding multicast data.

FIG. 13 illustrates each of the basic steps in the method that a router goes through when receiving multicast data from other routers and end points on networks to which it is directly connected. Each router receives a multicast data packet in step 184, then in step 185 the system first determines if the router is on the distribution tree for the group indicated in the multicast data packet header. If the determination was negative the system immediately waits for more data in step 195, but if positive then at step 186 the system determines whether the packet arrived on the parent branch of the distribution tree. If the determination was negative the system immediately waits for more data in step 195, but if positive then at step 187 the system starts searching the group forwarding table for child branches on the distribution tree. The system moves to step 188 to determine if a new child branch is found while searching the group forwarding table. If the determination was negative the system immediately waits for more data in step 195, but if positive then at step 189 the system forwards the multicast data packet to the port indicated in the group forwarding table. The system then continues back at step 188 looking for another child branch on the distribution tree.

Figure 14:
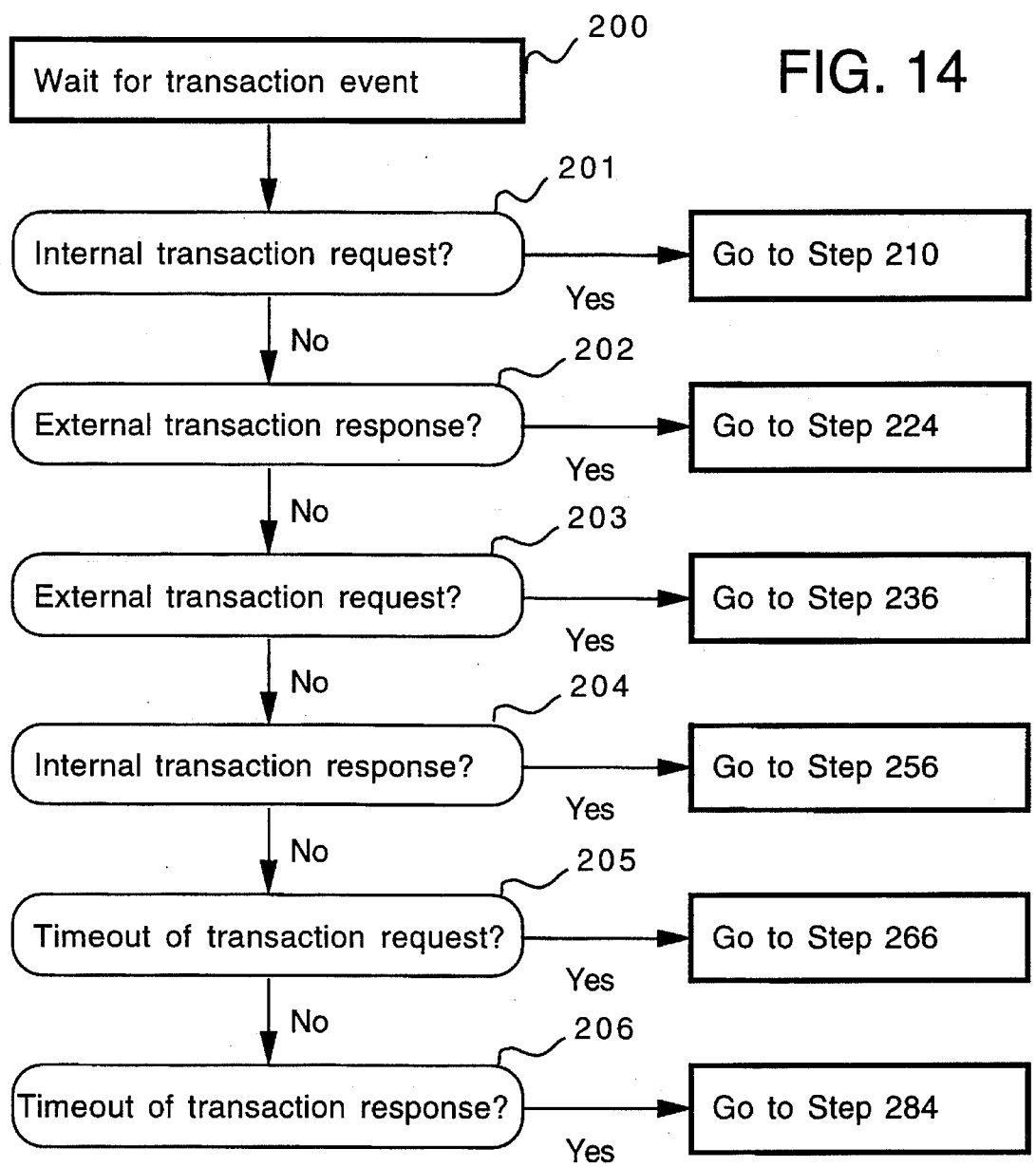
FIG. 14 is a flow diagram showing the top level steps of the multicast transaction protocol of the present invention for a router.

Referring now to FIGS. 14-19, these figures provide a flow diagram of the multicast transaction protocol of the present invention. Referring first to FIG. 14, and step 200, the system waits for a transaction event wherein it proceeds sequentially through the step of looking for an internal transaction request in step 201, an external transaction response at step 202, an external transaction request at step 203, an internal transaction response at step 204, a timeout of transaction request at step 205, and a timeout of transaction response at step 206. A more detailed flow diagram of steps 201-206 is set forth in FIGS. 15-23.

Figure 15:
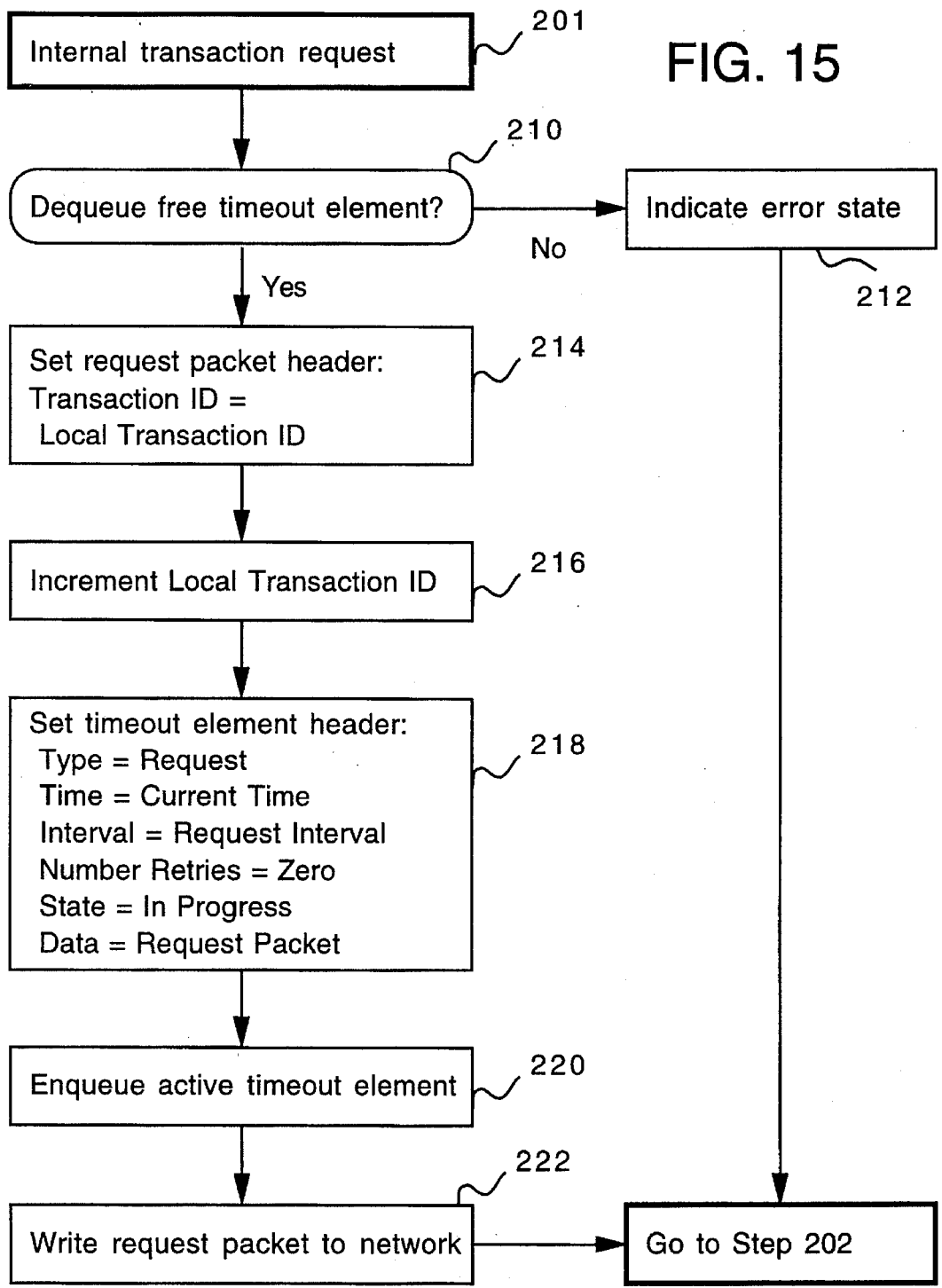
FIG. 15 is a flow diagram showing steps of the internal transaction request routine for a router in more detail.
Figure 16:
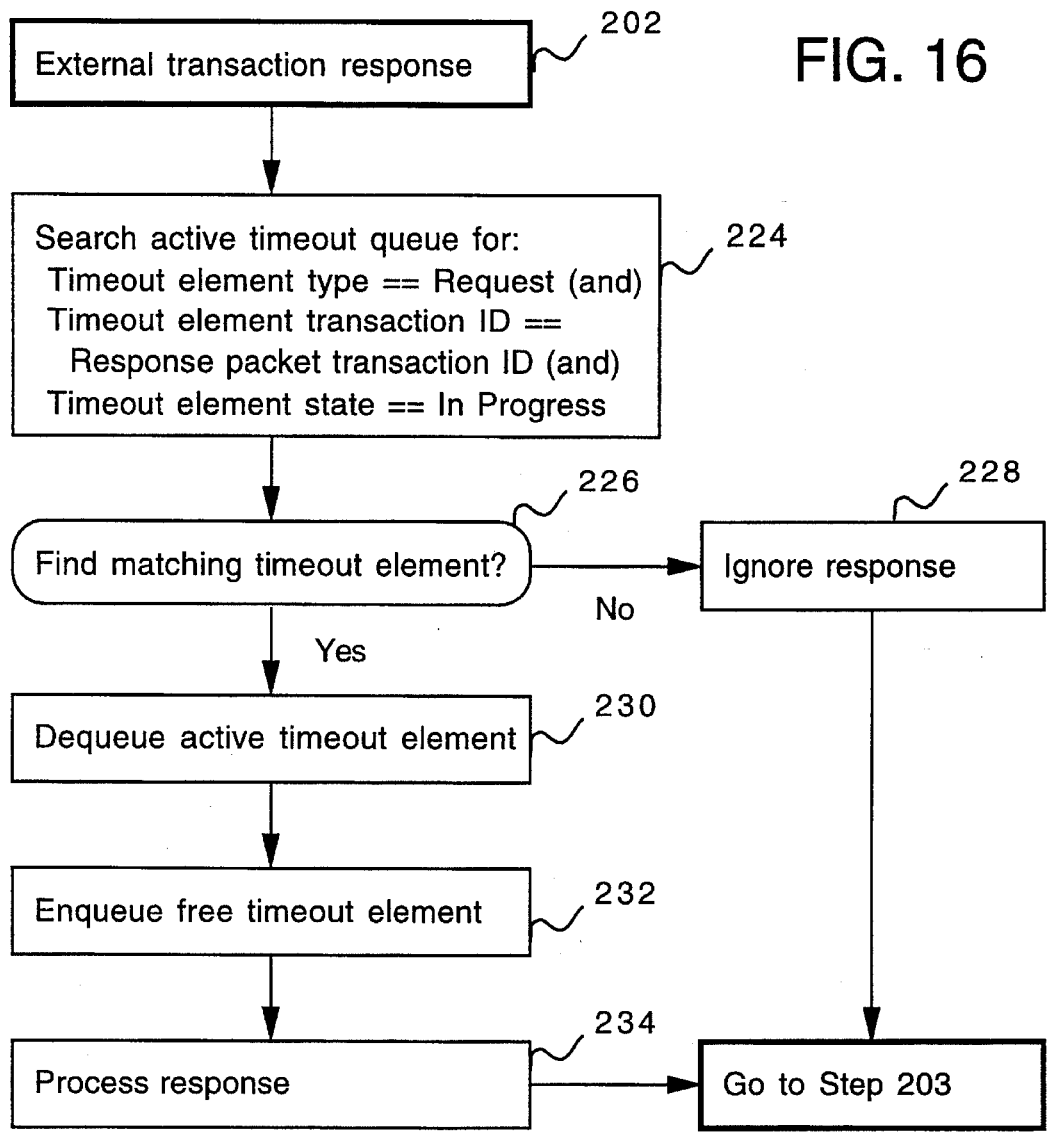
FIG. 16 is a flow diagram showing steps of the external transaction response routine for a router in more detail.

Beginning with step 201 in FIG. 15 for an internal transaction request routine, the system first determines if it can dequeue a timeout element from the free timeout queue in step 210. If negative the system indicates an error state in step 212, but if affirmative the system moves on to step 214 to set the request packet header with transaction ID equal to local transaction ID. From step 214 to step 216 the local transaction ID is incremented and in step 218 the timeout element header is set with information regarding the specific request. Next, in step 220 the timeout element is enqueued on the active timeout queue and at step 222 write request packet to the network. The system then proceeds to the external transaction step 202 in FIG. 16.

In step 224 of the external transaction response routine following step 202 the system searches the active timeout queue for a timeout element which matches the external transaction response, and then in step 226, determines if it found the matching timeout element. If negative result, the system ignores the response in step 228 and proceeds to step 203, but if affirmative moves to step 230 to dequeue the timeout element from the active timeout queue and then in step 232 to enqueue the timeout element on the free timeout queue. Following in step 234 the system processes the response and moves to the external transaction request step 203 in FIG. 17.

Figure 17:
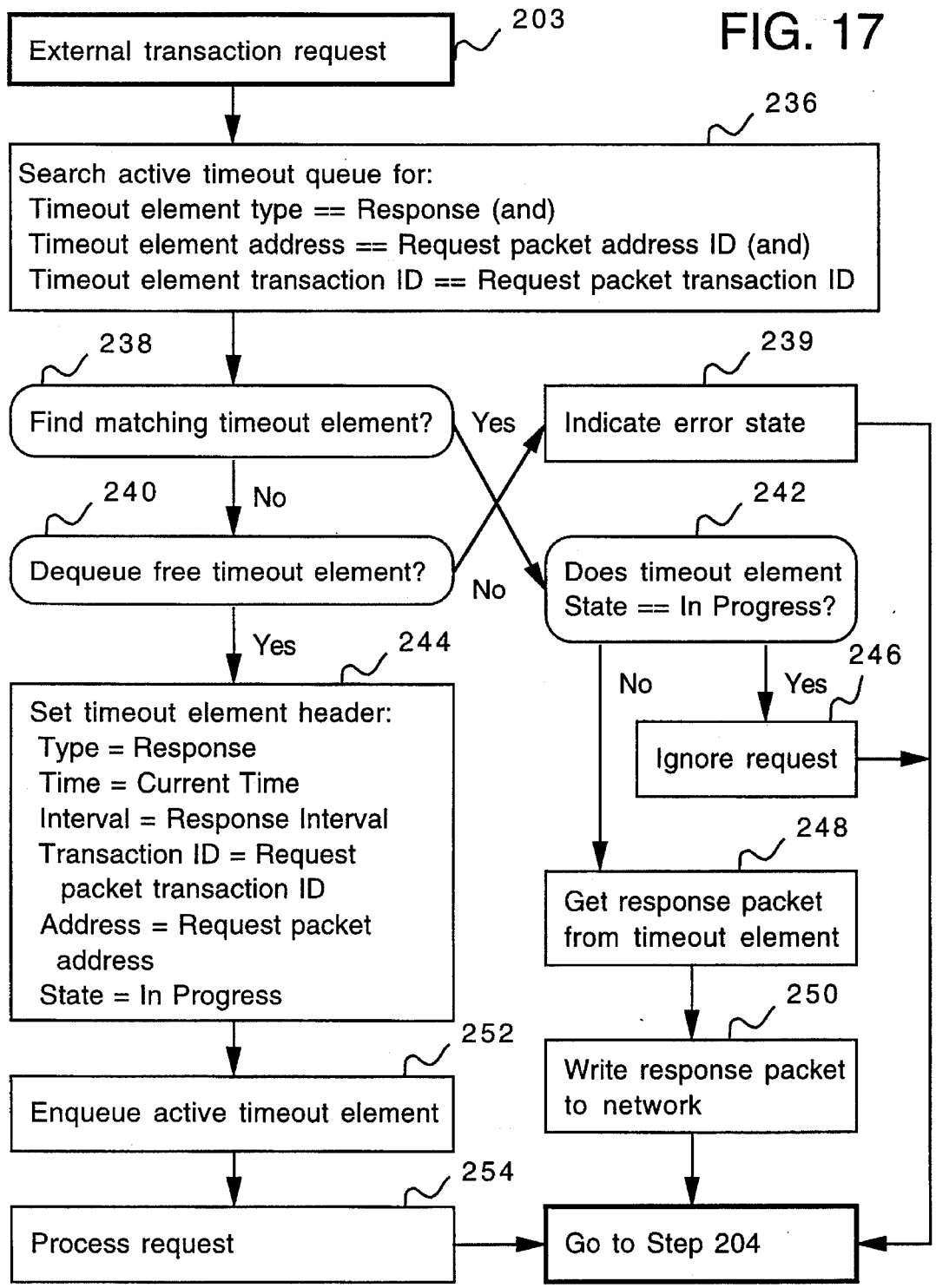
FIG. 17 is a flow diagram showing steps of the external transaction request routine for a router in more detail.

The external transaction request routine in FIG. 17 begins at step 236 by searching the active timeout queue for a timeout element which matches the external transaction request. Afterwards, the system goes to step 238 to determine if it found a matching timeout element, and if successful then to step 242 to see if the timeout element was in the state "in progress". If step 242 is affirmative, then go to step 246 to ignore request, but if negative then go to step 248 to get the response packet from the timeout element. From step 248 the method goes to step 250 to write the response packet to network.

Referring back to a negative response in step 238, the system moves to step 240 to determine if it can dequeue a timeout element from the free timeout queue, and if affirmative, then to step 244 to set the timeout element header. From step 244 the system in step enqueues the timeout element on the active timeout queue and then in step 254 processes the request and proceeds to the internal transaction request step 204. If a negative determination is made at step 240, then an error state is indicated at step 239 and the method goes to the internal transaction request step 204.

Figure 18:
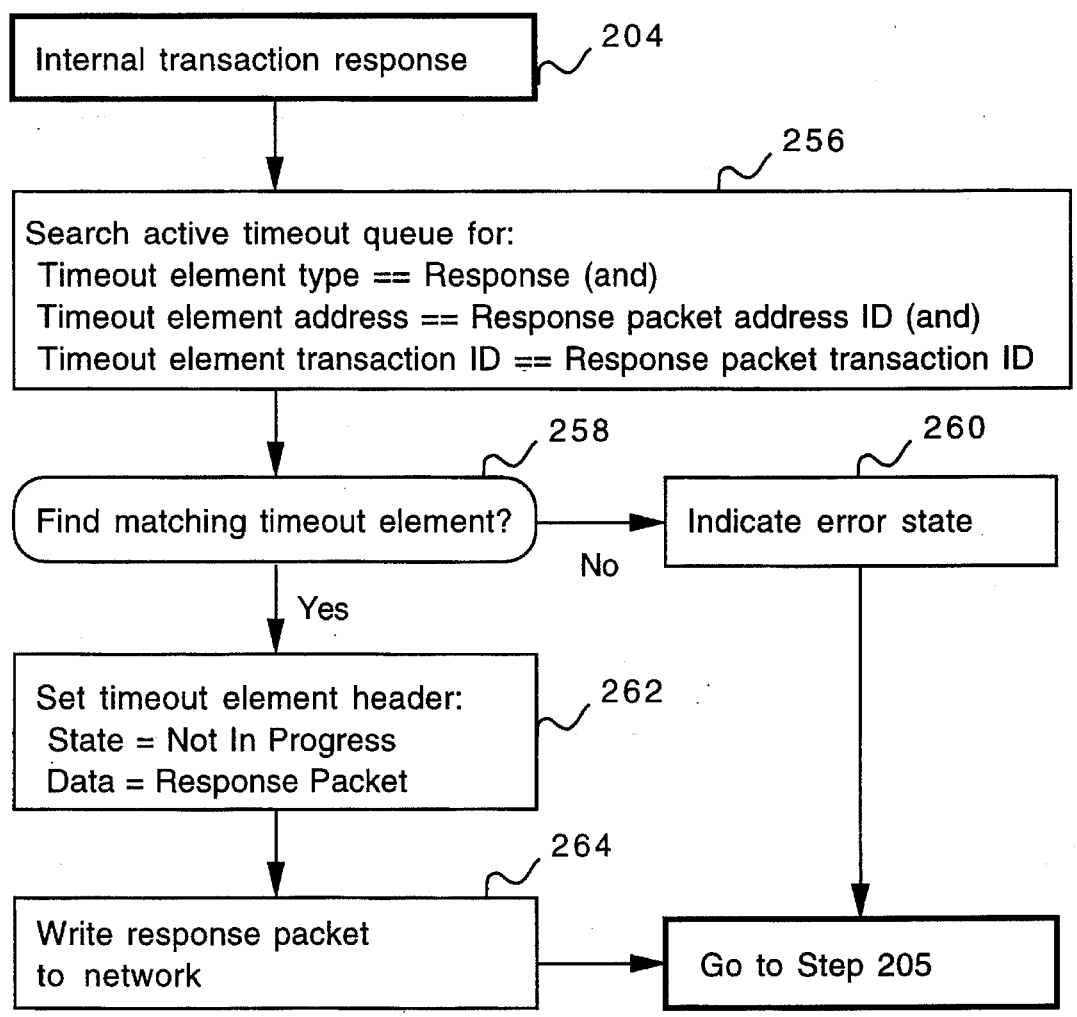
FIG. 18 is a flow diagram showing steps of the internal transaction response routine for a router in more detail.

FIG. 18 illustrates the internal transaction response beginning a step 204 and proceeding on to step 256 to search the active timeout queue for a timeout element which matches the internal transaction response. Next to step 258 to determine if it found a matching timeout element, which if negative results in an error state indication at step 260 and then to step 205 of the internal transaction request routine, but if positive the method goes to step 262 to set timeout header, to step 264 to write response packet to network, and then to the timeout of transaction request step 205.

Figure 19:
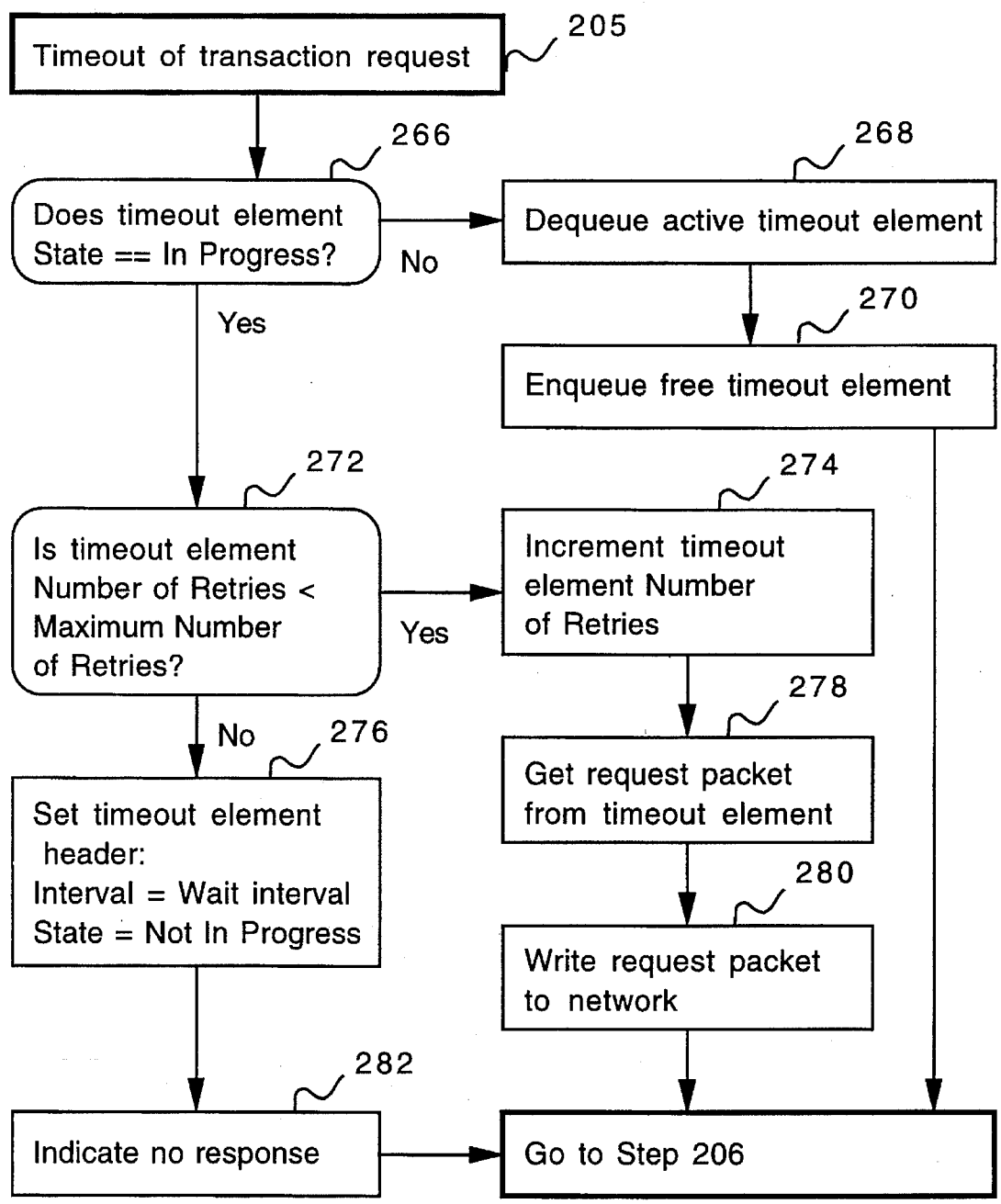
FIG. 19 is a flow diagram showing steps of the timeout transaction request for a router in more detail.

FIG. 19 illustrates the timeout of transaction request routine beginning at step 205 and proceeding to step 266 where the system first determines if the timeout element state is "in progress". If not, the system dequeues the timeout element from the active timeout queue at step 268, and enqueues the timeout element on the free timeout queue at step 270, and moves on to step 206. If the timeout element state is "in progress" at step 266, then the system moves on to step 272 to check if number of retries for the timeout element is less than the maximum allowed number of retries. If affirmative at step 272, the at step 274 the system increments the timeout element number of retries, at step 278 gets request packet from timeout element, at step 280 writes request packet to the network, and then goes on to step 206. If the number of retries is not less than maximum at step 272, then the system sets the timeout element header so that the state is "not in progress" and the timeout interval is set to the wait interval. Afterwards at step 282 the system indicates that it received no response to the request and then goes on to step 206.

Figure 20:
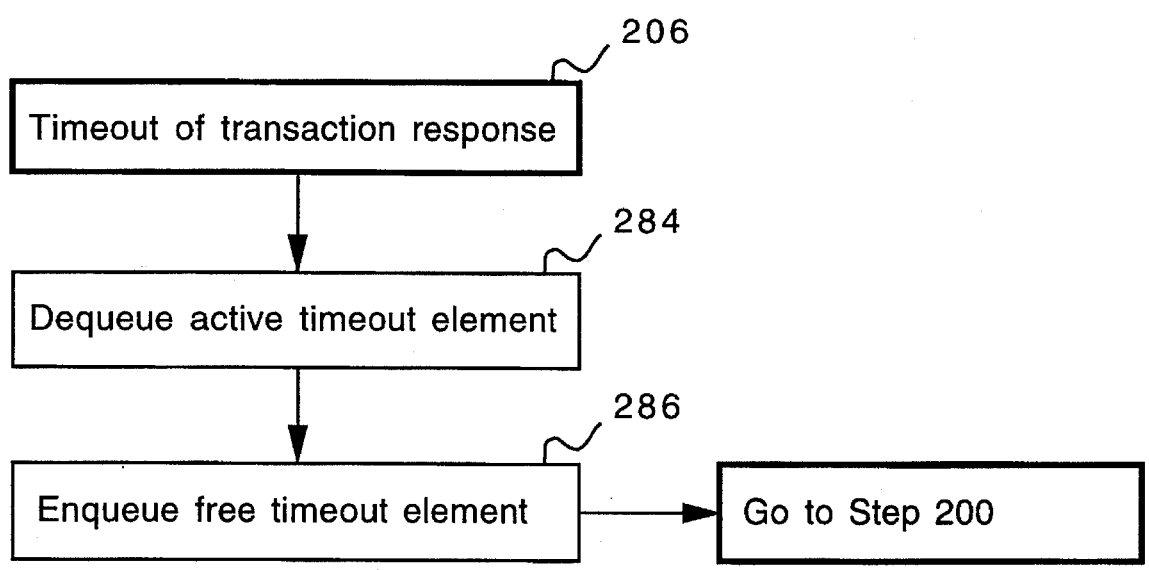
FIG. 20 is a flow diagram showing steps of the timeout transaction response routine for a router in more detail.

FIG. 20 illustrates the timeout of transaction response routine beginning at step 206 and proceeding to step 284 which dequeues the timeout element from the active timeout queue. Next in step 286 the system enqueues the timeout element on the free timeout queue and then goes on to step 200.

Figure 21:
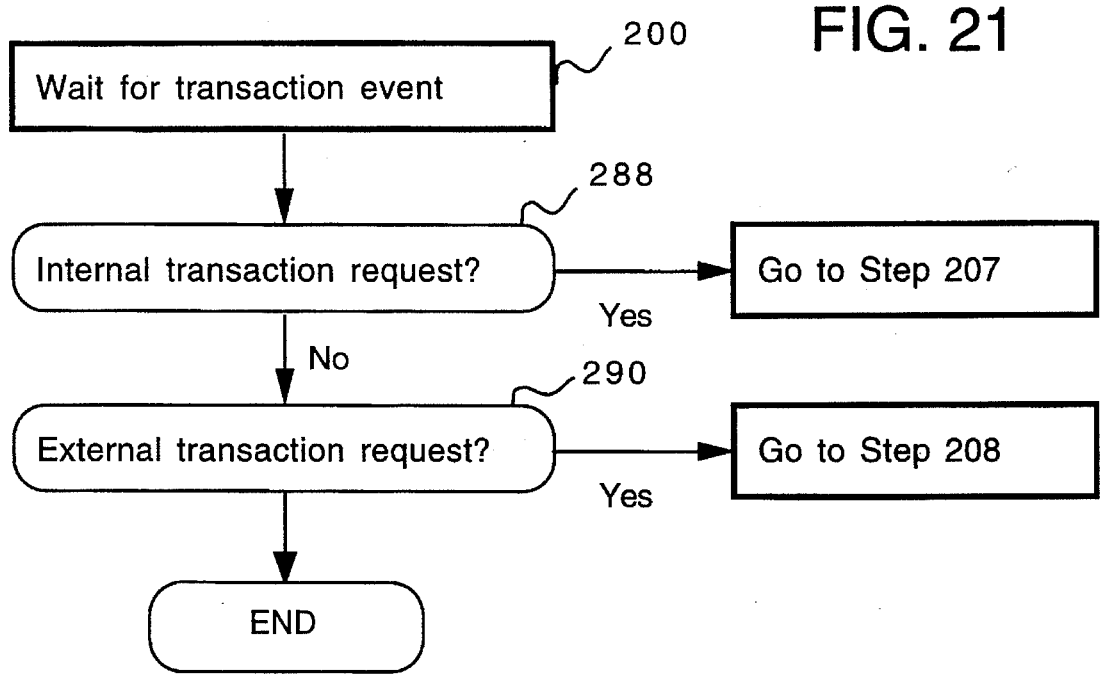
FIG. 21 is a flow diagram showing the top level steps of the multicast transaction protocol of the present invention for an endpoint.

FIG. 21 illustrates each of the basic steps the method an endpoint goes through in executing transaction requests. In step 288 the system checks for an internal transaction request, and if affirmative goes to step 207. If negative at step 288 the system goes to step 290 to check for an external transaction request, and if affirmative, goes on to step 208. The steps following each of these major determination steps will be illustrated in more detail in the following figures.

Figure 22:
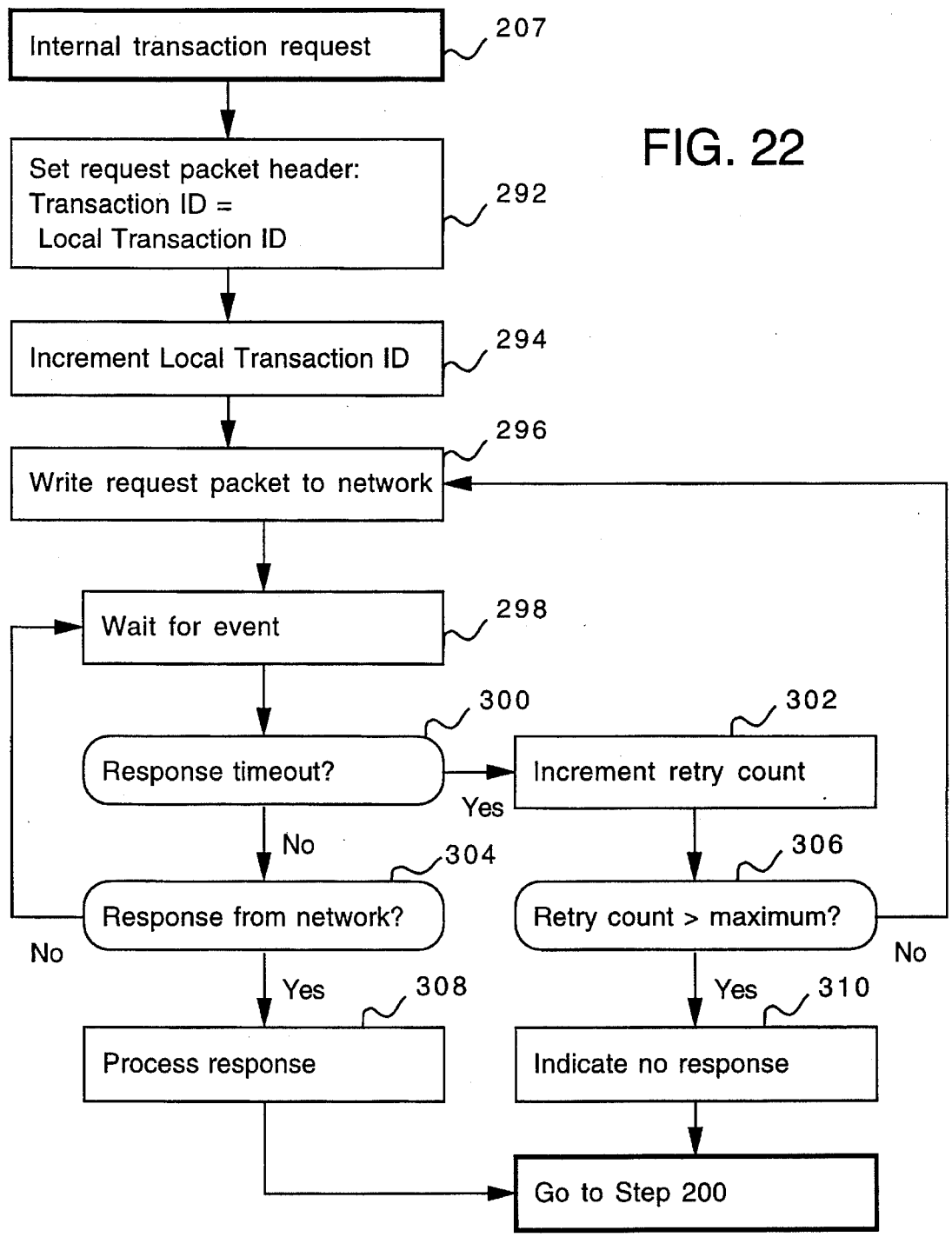
FIG. 22 is a flow diagram showing steps of the internal transaction request protocol routine for an endpoint in more detail.

FIG. 22 illustrates the internal transaction request routine for an endpoint. Following step 207, at step 292 the system sets the request packet header by setting the transaction ID equal to the local transaction ID. Next in step 294 the system increments the local transaction ID and in step 296 writes the request packet to the network. Following in step 298 the system waits for an event and then in step 300 checks if the event is a response timeout. If affirmative, then increment the retry count in step 302. Next in step 306 the system checks if the retry count is more than the maximum, if negative returns to step 296, but if affirmative goes to step 310 to indicate no response to the request and then on to step 200.

Back at step 300, if the event was not a response timeout, then at step 304 check if the event was a response from the network. If negative, go to step 298, but if affirmative go to step 308 to process the response and then on to step 200.

Figure 23:
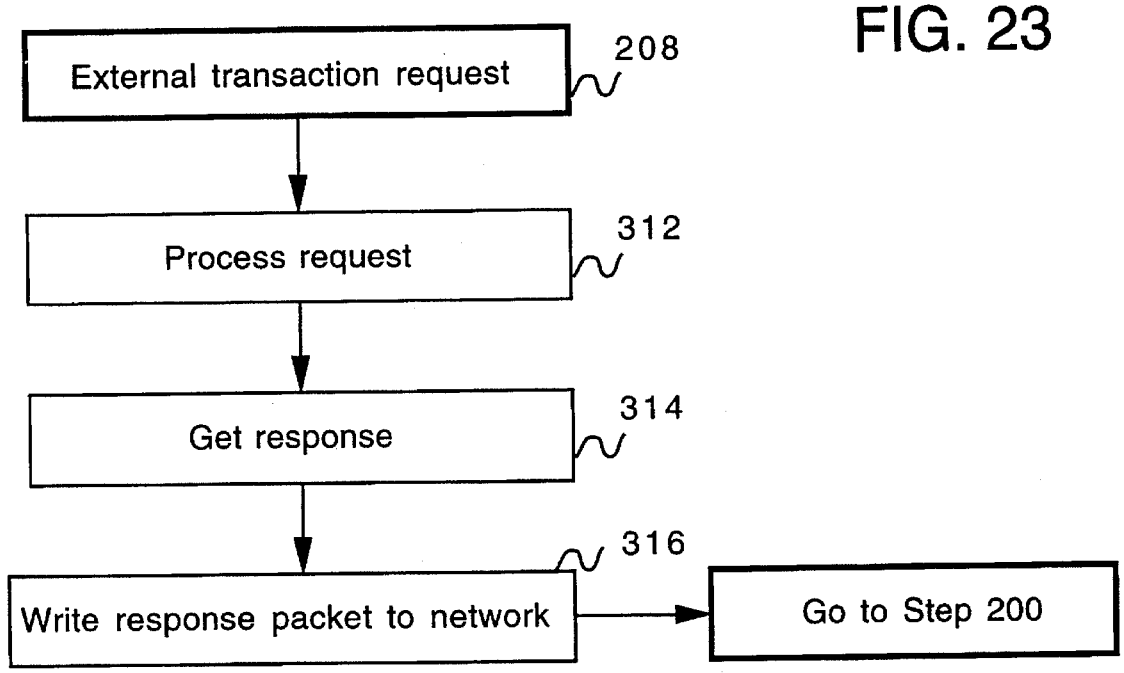
FIG. 23 is a flow diagram showing steps of the external transaction request protocol for an endpoint in more detail.

FIG. 23 illustrates the external transaction request routine for an endpoint beginning at step 208. Next at step 312 the system processes the request, then at 314 gets the response. Next at 316 the system writes the response packet to network and then goes on to step 200.

While the present invention has been described with reference to certain preferred embodiments, those skilled in the art will recognize that various modifications may be provided. Such modifications are provided for by the invention which is limited only by the following claims.

I claim as my invention:

1. A method for creating a multicast distribution tree in a computer system, comprising the steps of:

transmitting, by a listener computer, coupled by a common network, to a first designated router, a join group request which includes a multicast address which contains a network number that identifies a particular network and which requests data from the particular network, scanning, by the first designated router, the forwarding table of the first designated router to locate the particular multicast request included in the join group request, to determine whether the first designated router is currently receiving data from the particular multicast address, and if not, then scanning, by the first designated router, the routing table of the first designated router to locate the network number contained in the particular multicast address and a corresponding second designated router, coupled to a network common to that of the first designated router, for receiving data from the particular network, and requesting, by the first designated router, transmission of data from the particular network through the second designated router.

2. The method of claim 1, further comprising the step of:

transmitting, by the first designated router, data to the listener computer to start receiving data, if the first designated router is currently receiving data from the particular network.

3. The method of claim 1, further comprising the steps of:

scanning, by the second designated router, the forwarding table of the first designated router to locate the particular multicast request included in the join group request, to determine whether the second designated router is currently receiving data from the particular multicast address, and if not, then scanning, by the second designated router, the routing table of the second designated router to locate the network number contained in the particular multicast address and a corresponding third designated router, coupled to a network common to that of the second designated router, for receiving data from the particular network, and requesting, by the second designated router, transmission of data from the particular network through the third designated router.

4. The method of claim 3, further comprising the steps of:

scanning, by the third designated router, of the forwarding table of the first designated router to locate the particular multicast request included in the join group request, to determine whether the third designated router is currently receiving data from the particular multicast address, and if not, then scanning, by the third designated router, the routing table of the third designated router to locate the network number contained in the particular multicast address and a corresponding fourth designated router, coupled to a network common to that of the third designated router, for receiving data from the particular network, and requesting, by the third designated router, transmission of data from the particular network through the fourth designated router.

5. A method for multicasting data in a computer system, comprising the steps of:

transmitting, by a source computer, a create request to a first designated router coupled to a first network common to the source computer;

creating, by the first designated router, a multicast address corresponding to data transmitted by the source computer; and transmitting, by the source computer, data including said multicast address upon the first network.

6. The method of claim 5, wherein the multicast address includes a network number and a socket number, wherein the socket number corresponds to a particular source computer.

7. The method of claim 6, wherein each network is identified by network numbers within a predetermined numerical range.

8. The method of claim 6, wherein the socket number assigned to a particular source computer is based on a random number.

9. The method of claim 5, further comprising the steps of:

transmitting, by the designated router, a query to adjacent routers at predetermined time intervals to determine if listener computers, present on networks adjacent to the designated router, are currently receiving data from a particular network;

checking for responses to the transmitted query; and terminating, by the designated router, transmission of data from adjacent networks that, during a predetermined amount of time following transmission of the query, have provided no response.

10. The method of claim 5, further comprising the step of:

storing multicast addresses in a forwarding table in the designated router.

11. The method of claim 10, further comprising the steps of:

receiving a join request, from a second router on a second network adjacent to the first designated router, to the first designated router to start forwarding data from a network having a particular multicast address; and checking, by the first designated router, a routing table to confirm if the first designated router is receiving data having the particular multicast address; and if so, forwarding the data having the particular multicast address to the second designated router.

12. The method of claim 5, wherein the multicast address includes a network number and a socket number.

13. The method of claim 12, wherein the router generates the multicast address.

14. The method of claim 12, further comprising the step of:

deleting unused data from the forwarding table in response to changing activity of the networks.

15. The method claim 5 utilizing transport layer routing that is independent of network layer unicast routing, and further comprising the steps of:

initializing a routing table of a router;

sending a distance vector request on each port of the router coupled to a network;

updating the routing table in response to receiving a distance vector request; and sending, in response to the distance vector request, a distance vector which reflects changing activity of networks coupled to the router.

16. The method of claim 15, wherein the router coupled to the network is a designated router.

17. The method of claim 5, further comprising the step of:

identifying receiving and sending computers by a multicast address that is transmitted in the multicast data.

18. An apparatus for creating a multicast distribution tree, comprising:

a common network;

a designated router coupled to the common network;

listener computer means, coupled to the common network, for transmitting, to the first designated router, a join group request which includes a multicast address which contains a network number that identifies a particular network and which requests data from the particular network;

said first designated router including means for scanning the forwarding table of the first designated router to locate the particular multicast request included in the join group request to determine if the first designated router is receiving data from the particular multicast address;

means for scanning a first routing table when the first designated router is not currently receiving data from the particular network, to locate the network number contained in the particular multicast address and a corresponding second designated router, coupled to a network common to that of the first designated router, for receiving data from the particular network; and means for requesting transmission of data from the particular network through the second designated router, if the first designated router is not currently receiving data from the particular network.

* * * * *